United States Patent [19]
Brink

[11] Patent Number: 5,366,558
[45] Date of Patent: Nov. 22, 1994

[54] METHOD OF TREATING BIOMASS MATERIAL

[76] Inventor: David L. Brink, 1068 Woodside Rd., Berkeley, Calif. 94708

[21] Appl. No.: 73,780

[22] Filed: Jun. 8, 1993

Related U.S. Application Data

[60] Division of Ser. No. 676,836, Mar. 28, 1991, Pat. No. 5,221,357, which is a continuation of Ser. No. 58,814, Jun. 8, 1987, abandoned, which is a continuation-in-part of Ser. No. 324,032, Nov. 23, 1981, Pat. No. 4,384,897, Ser. No. 23,338, Mar. 23, 1979, abandoned, and Ser. No. 681,435, Dec. 13, 1984, abandoned, which is a continuation-in-part of Ser. No. 653,065, Sep. 21, 1984, Pat. No. 4,706,903.

[51] Int. Cl.$^5$ ............................ C13K 1/02; D21B 1/16; D21C 3/16
[52] U.S. Cl. ........................................ 127/43; 127/37; 162/25; 162/81
[58] Field of Search ................ 127/1, 37, 43; 162/25, 162/81

[56] References Cited

U.S. PATENT DOCUMENTS 4,706,903 11/1987 Brink et al. ............................ 127/1

Primary Examiner—R. Bruce Breneman
Assistant Examiner—Patricia Hailey
Attorney, Agent, or Firm—Flehr, Hohbach, Test, Albritton & Herbert

[57] ABSTRACT

Two stage hydrolysis of lignocellulosic material, conditions during the first stage being such as to hydrolyze or depolymerize the hemicellulosic component without substantial degradation of resulting monosaccharides, conditions during the second stage being such as to hydrolyze the cellulose to glucose without substantial degradation of the glucose. The solids left after first stage hydrolysis are disintegrated mechanically thereby greatly facilitating second stage hydrolysis. Hydrolysis in both stages is preferably accomplished by the use of nitric acid. The pH retention time and temperature in both stages are selected to maximize production of the desired monosaccharide or monosaccharides.

1 Claim, 10 Drawing Sheets

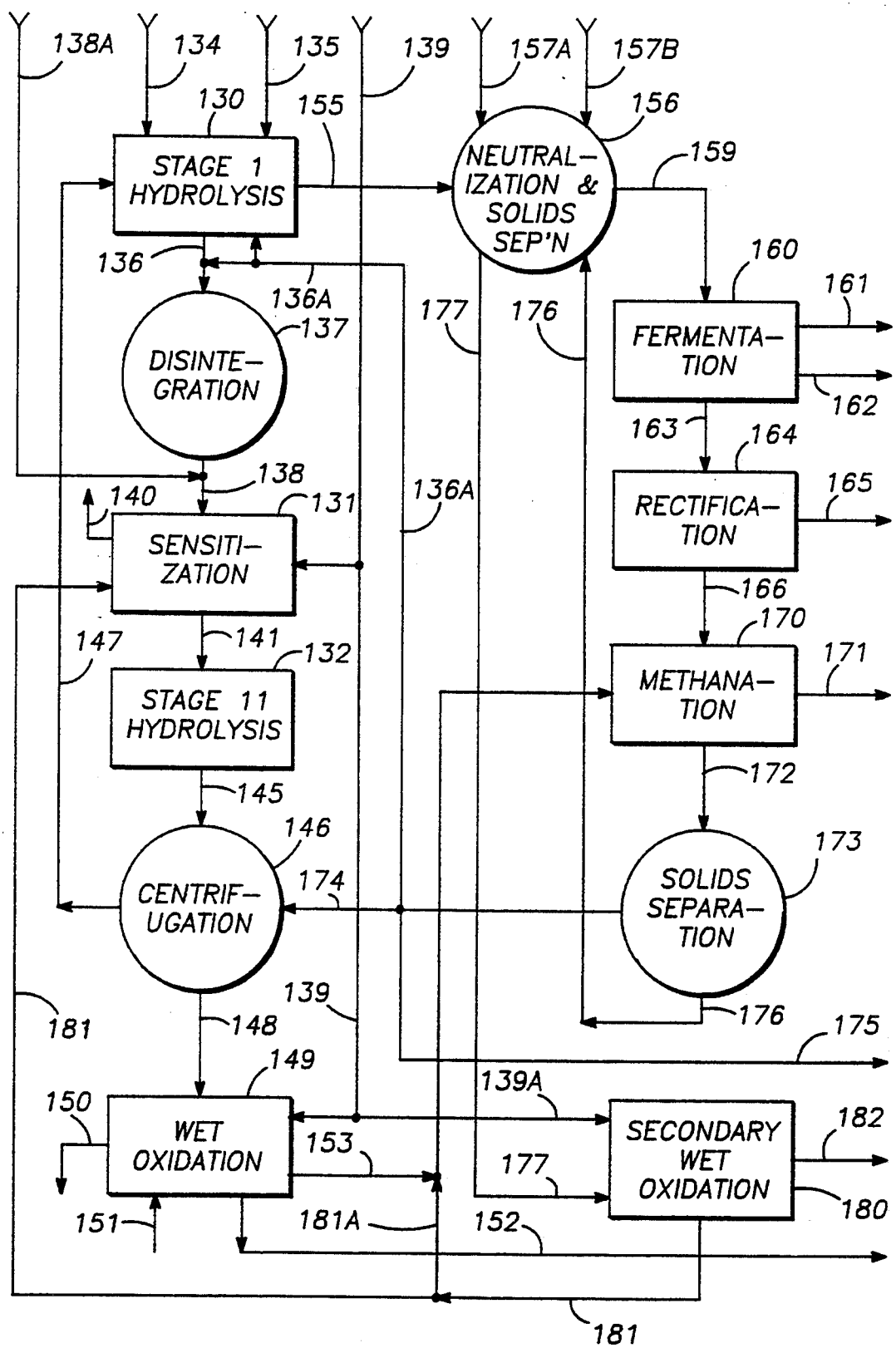
FIG.—4

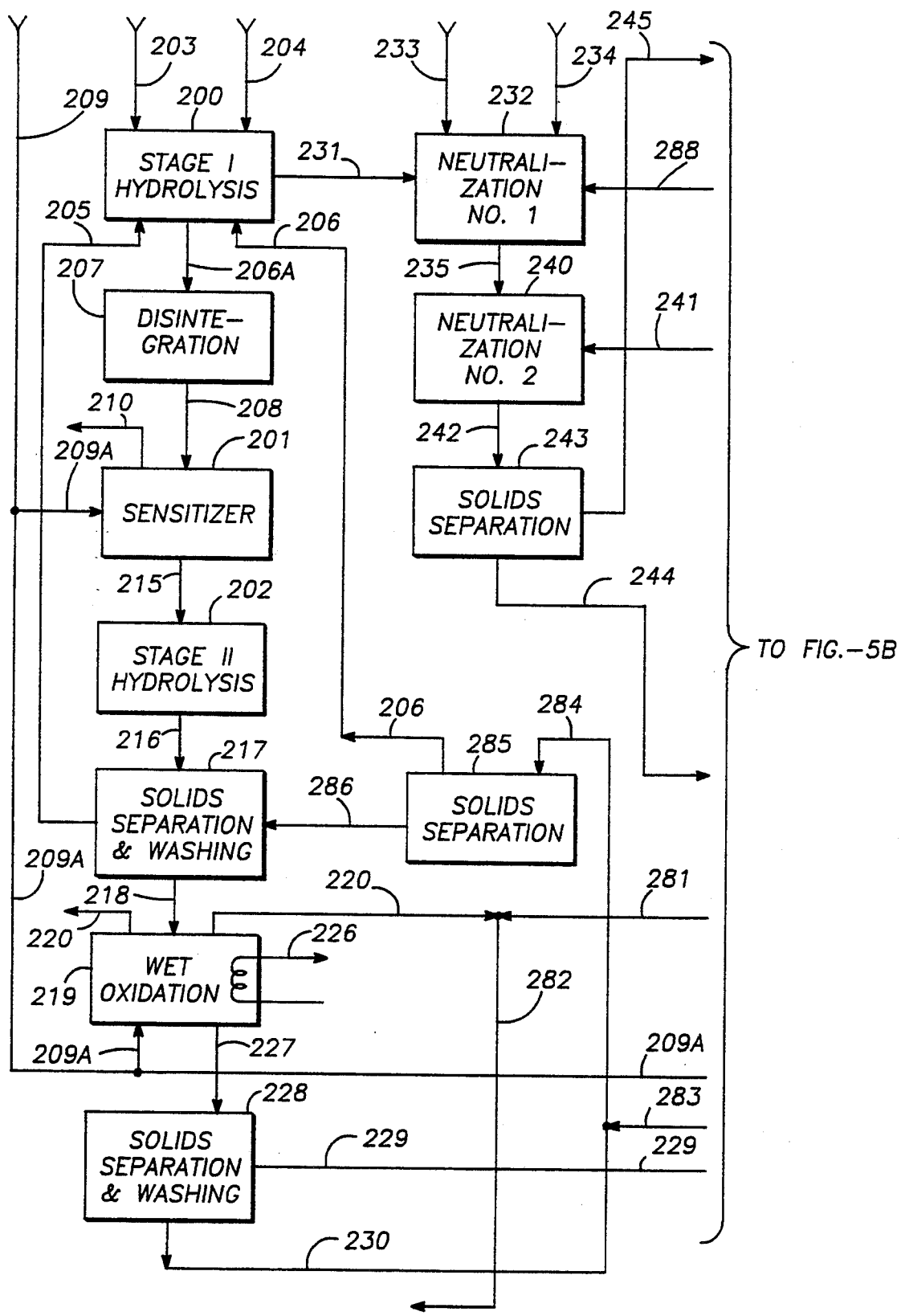
FIG.—5A

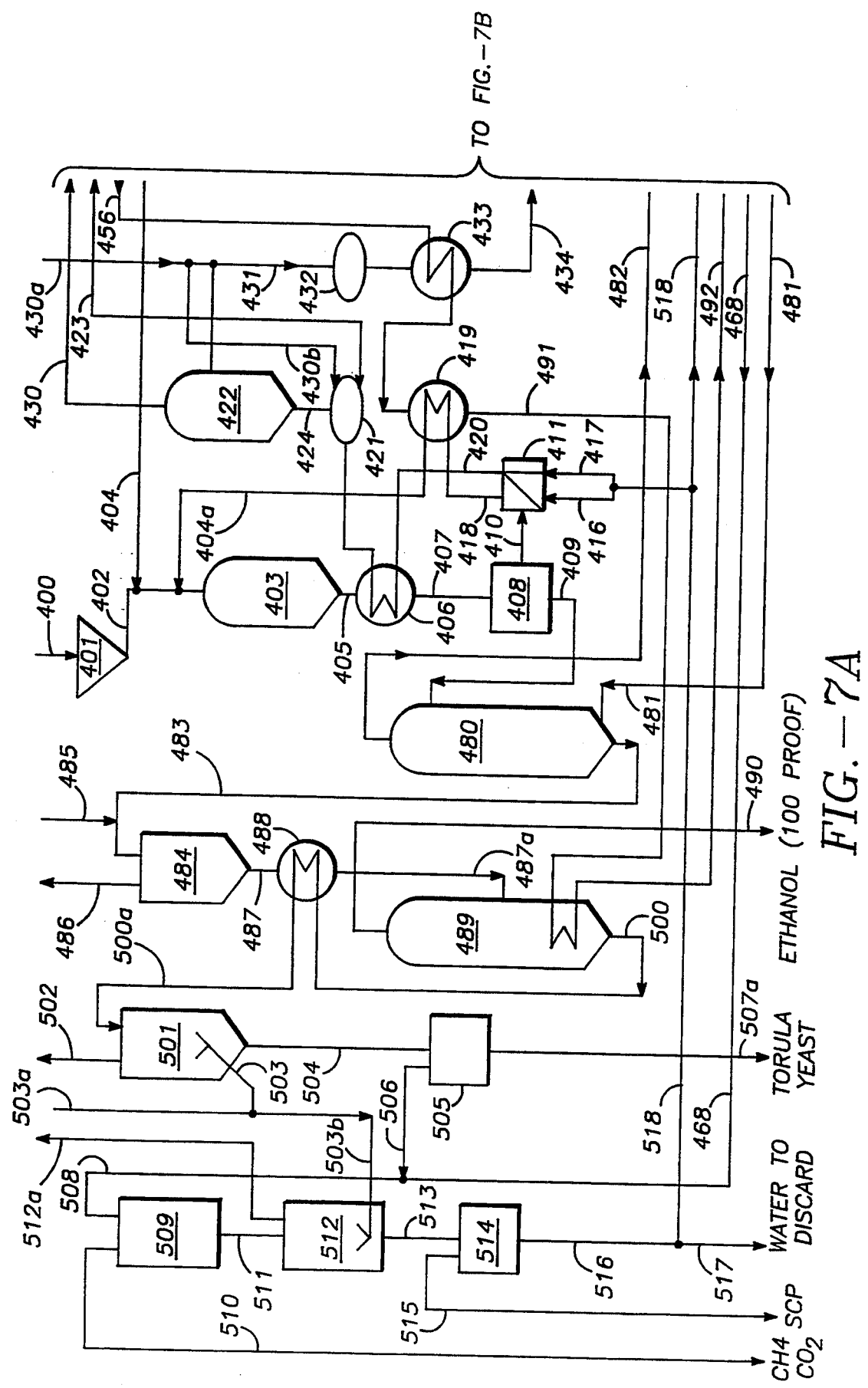
FIG.—7A

METHOD OF TREATING BIOMASS MATERIAL

This is a division of application Ser. No. 07/676,836 filed Mar. 28, 1991, now U.S. Pat. No. 5,221,357, which is a continuation of application Ser. No. 07/058,814, now abandoned, filed Jun. 8, 1987, which is a continuation in part of the following copending applications: Brink, Ser. No. 324,032, filed Nov. 23, 1981, entitled "Method of Treating Biomass Material," now U.S. Pat. No. 4,384,897, issued May 24, 1983; Brink and Schaleger, Ser. No. 23,338, filed Mar. 23, 1979, entitled "Utilization of Cellulosic and Lignocellulosic Materials," now abandoned and Brink, Ser. No. 681,435, filed Dec. 13, 1984, entitled "Method of Treating Biomass Material" now abandoned, which is a continuation in part of Brink, Merriman and Mixon, Ser. No. 06/653,065, filed Sep. 21, 1984, entitled "Apparatus for the Hydrolysis and Disintegration of Lignocellulosic Material," issued Nov. 17, 1987, as U.S. Pat. No. 4,706,903.

This invention relates to the treatment of polysaccharide material such as cellulose, hemicelluloses and lignocellulose by hydrolysis to produce monosaccharides such as pentoses and hexoses; to the production of ethanol from such monosaccharides; to the wet oxidation of solids such as lignin to produce soluble products of value such as organic acids; and to the methanation of residues from wet oxidation and fermentation-rectification.

In Brink and Schaleger, U.S. patent application Ser. No. 23,338, filed Mar. 23, 1979, entitled "Utilization of Cellulosic and Lignocellulosic Materials," there is described a process as follows: Biomass material is subjected to a first stage hydrolysis under relatively mild conditions, typically about 140° to 220° C. at a pH of about 2.0 to 3.0 to cause hydrolysis of the more readily hydrolyzable polysaccarides such as the hemicelluloses. This results in the production of pentoses and hexoses. This hydrolysis step is followed by a sensitization step in which the material is contacted with molecular oxygen, e.g., air, typically at a temperature of about 140° to 220° C. This is followed by a second stage hydrolysis under more severe conditions, typically a temperature of about 160° to 240° C. The solids which are not solubilized by this treatment, e.g., lignin where the biomass feed material is lignocellulose, is then subjected to wet oxidation in which molecular oxygen, for example, air is passed through a slurry of the solids under conditions to cause oxidation and the production of heat which can be used in the process or for other purposes.

The process of Brink, U.S. Pat. No. 3,562,319 may be used in the wet oxidation step.

Conditions in the first stage hydrolysis, sensitization, second stage hydrolysis and wet oxidation, e.g., temperatures and pH, may be as described in the Brink and Schaleger patent application at page 4, line 6 to page 7, line 22 which is incorporated herein by reference. Flow rates are adjusted to optimize yields and concentrations. It is advantageous to maintain the hydrolytic and sensitization conditions to effect maximum yields and concentration of monosaccharides but in order to achieve high yields it may be necessary to sacrifice concentration and vice versa. An optimum balance should be maintained.

The products of this Stage I hydrolysis-sensitization-Stage II hydrolysis-wet oxidation process include sugar solutions and organic acids, aldehydes, etc. An aqueous solution of predominantly pentoses may be produced separately from an aqueous solution of predominantly glucose or a single stream of hydrolysate containing both pentoses and glucose may be produced. These monosaccharides are subjected to fermentation to produce ethanol and the beer resulting from fermentation may then be subjected to rectification to produce ethanol of commercial grade, for example, 95% ethanol.

Residues from the wet oxidation and rectification steps may be subjected to methanation by processes well known to the art involving the use of micro-organisms.

It is an object of the present invention to provide improvements upon the process of application Ser. No. 23,338. Among such improvements are more efficient washing of solids, the use of co-current washing or countercurrent washing of solids according to whether the solids are easily washed or can be washed only with difficulty, the use of ferric and/or aluminum ions as flocculating agents to separate suspended solids from hydrolysate and the recovery of these ions by wet oxidation to be recycled, used as catalysts in hydrolysis and again as flocculating agents.

The above and other objects will be apparent from the ensuing description and the appended claims.

Certain embodiments of the invention are illustrated by way of example in the accompanying drawings in which:

FIG. 4 is a flow diagram of a hydrolytic system such as that of FIGS. 1 to 4 in combination with a wet-oxidation-fermentation-methanation system.

Figure 5B:
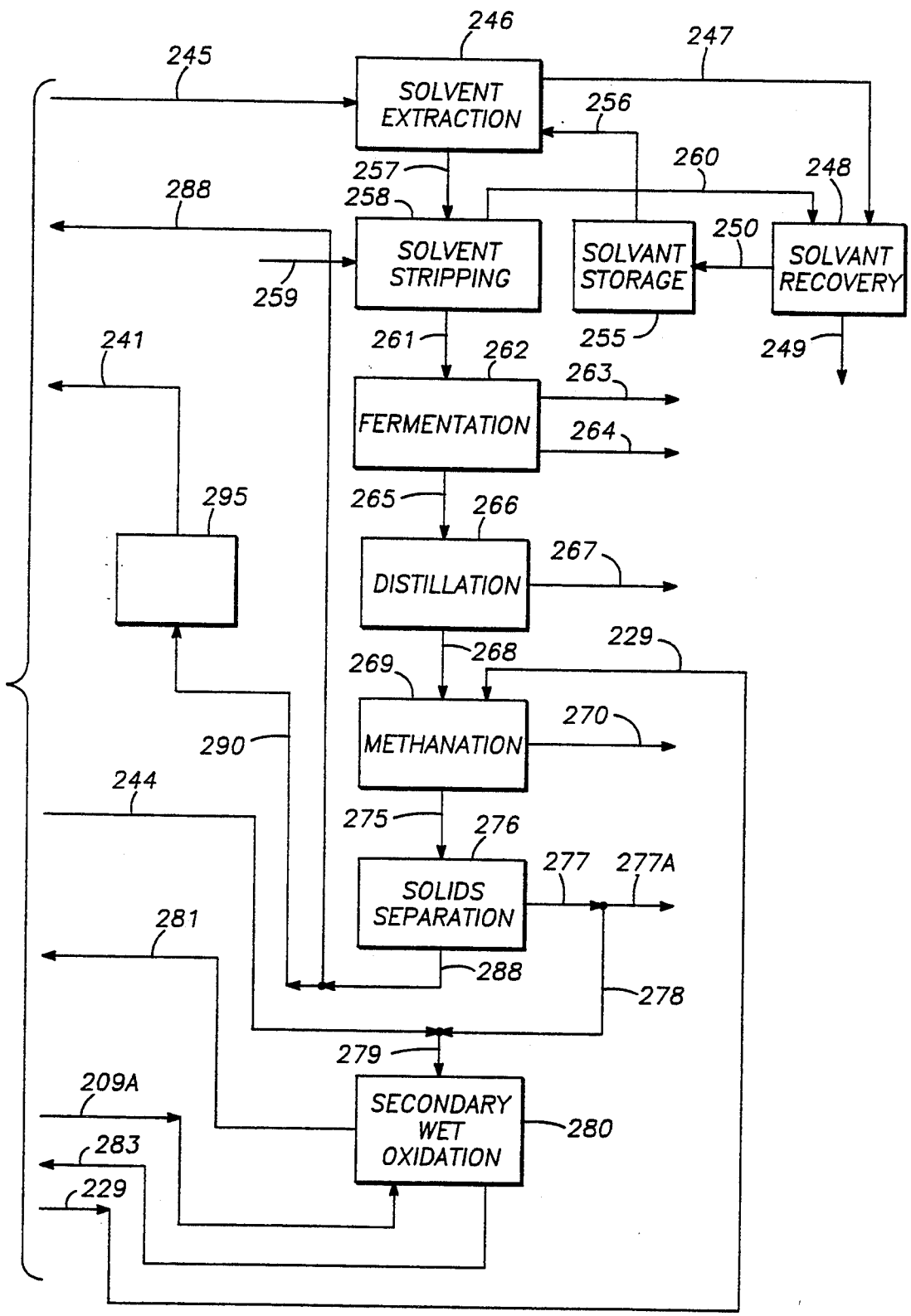

FIGS. 5A and 5B (the latter being a continuation of the former) are a flow diagram of another embodiment of the invention.

Figure 6:
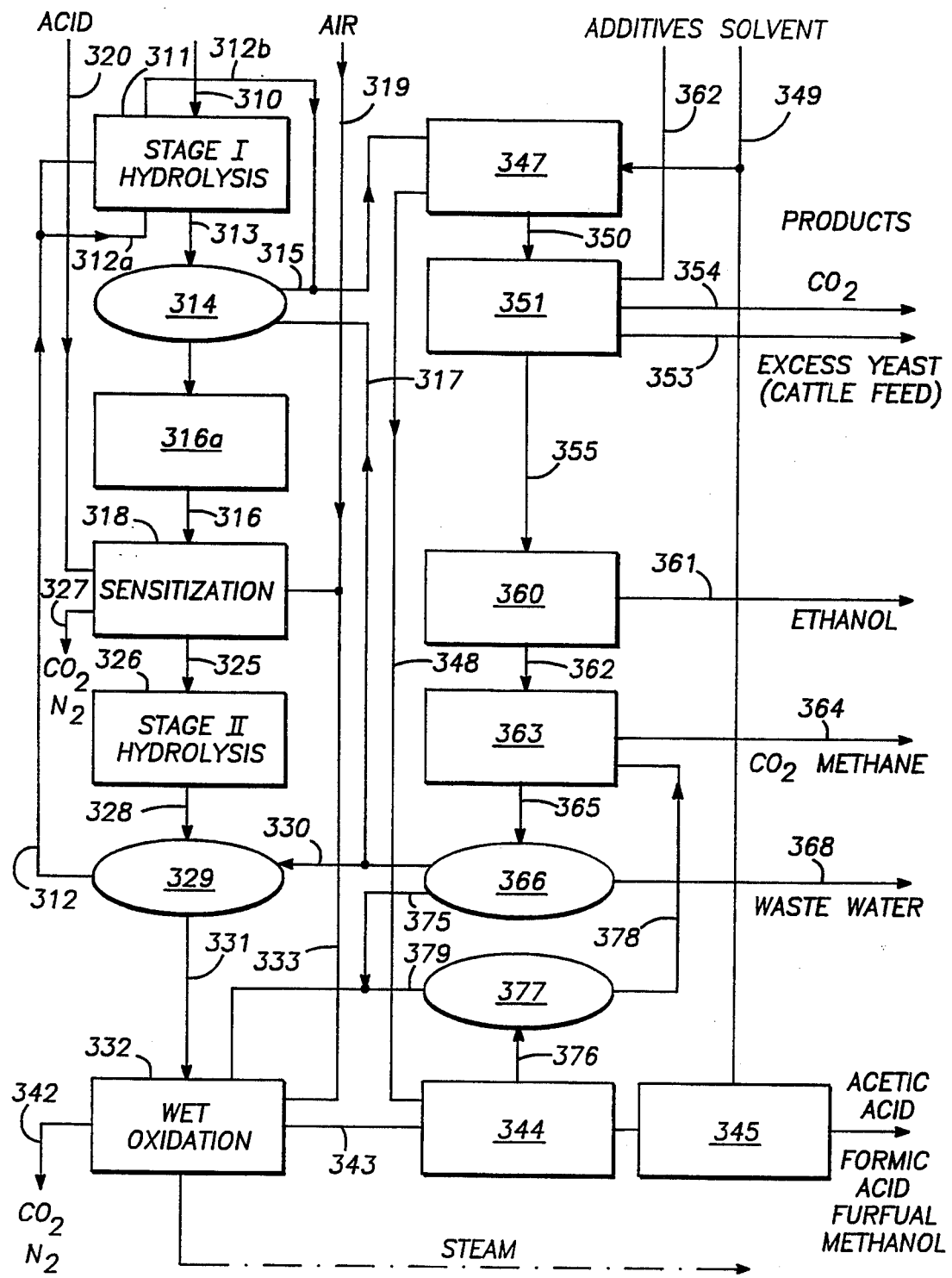
Figure 7B:
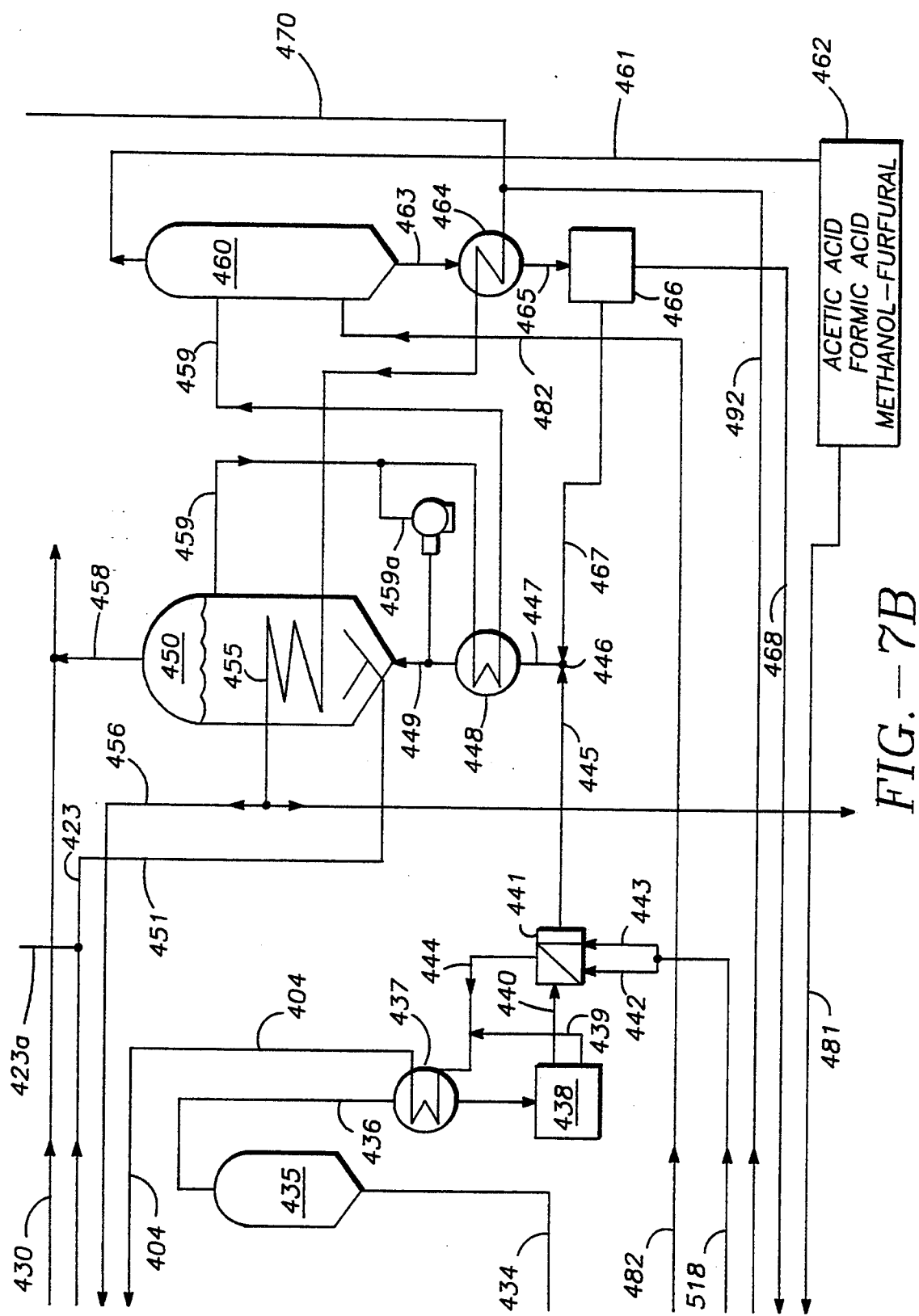
Figure 8:
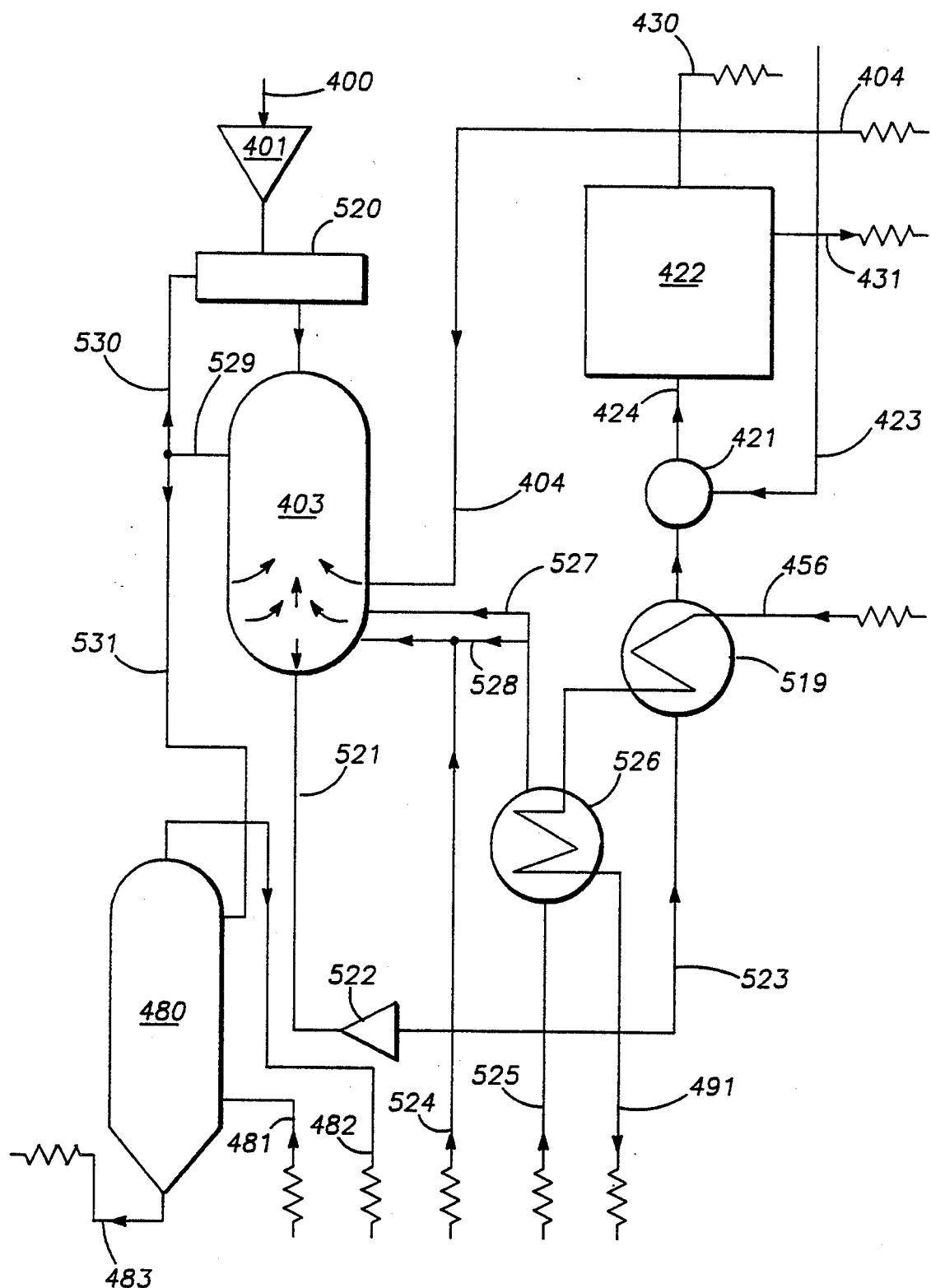

FIGS. 6, 7 and 8 are flow diagrams taken from the aforesaid Brink and Schaleger U.S. patent application Ser. No. 23,338 in which FIG. 6 is a simplified flow diagram corresponding to FIG. 1 of the Brink and Schaleger patent application.

Figure 2:
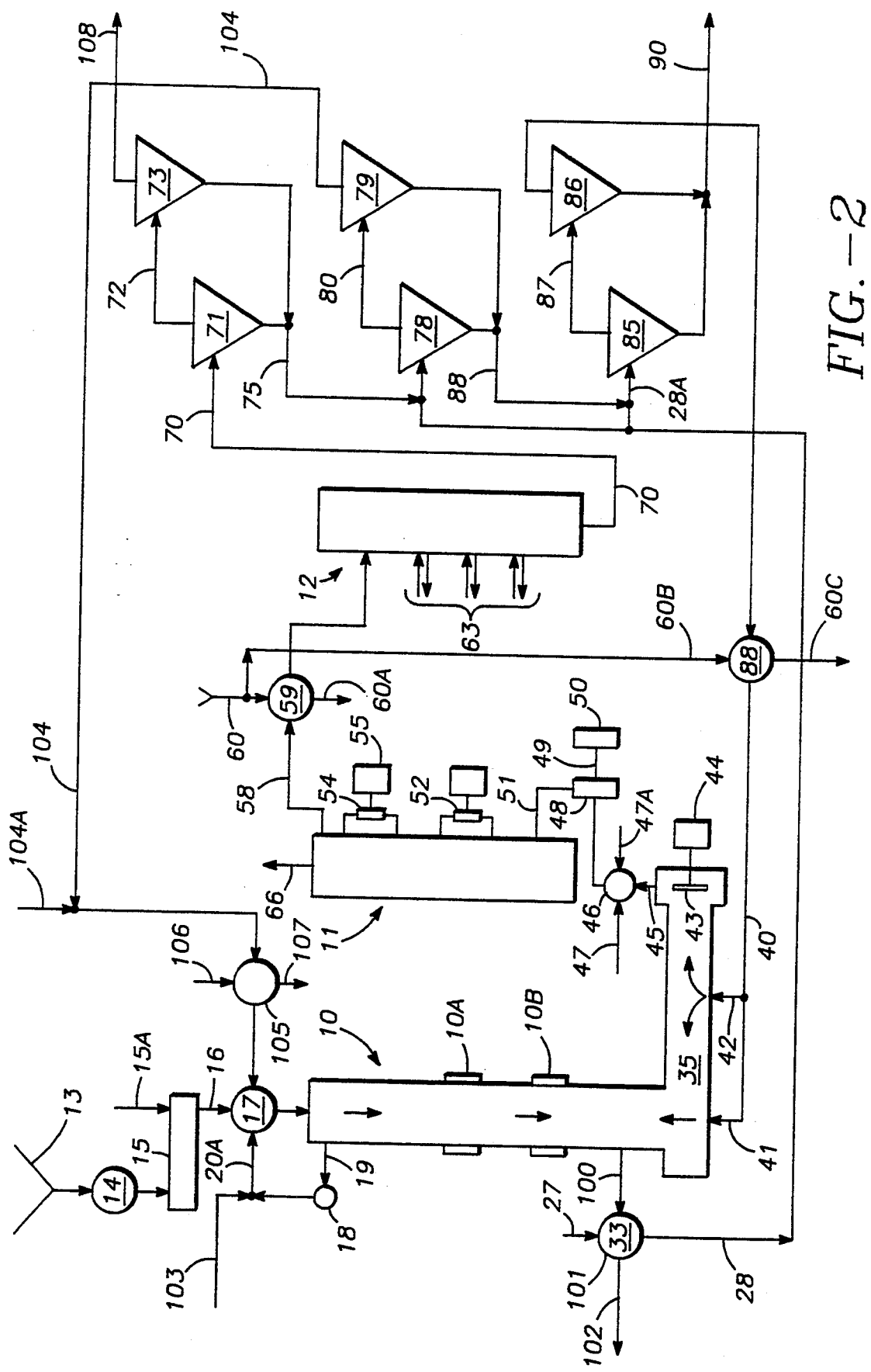
FIG. 2 is a flow diagram of another embodiment of the invention.

FIG. 7 is a more detailed flow diagram corresponding to FIG. 2 of the Brink and Schaleger patent application.

Figure 3:
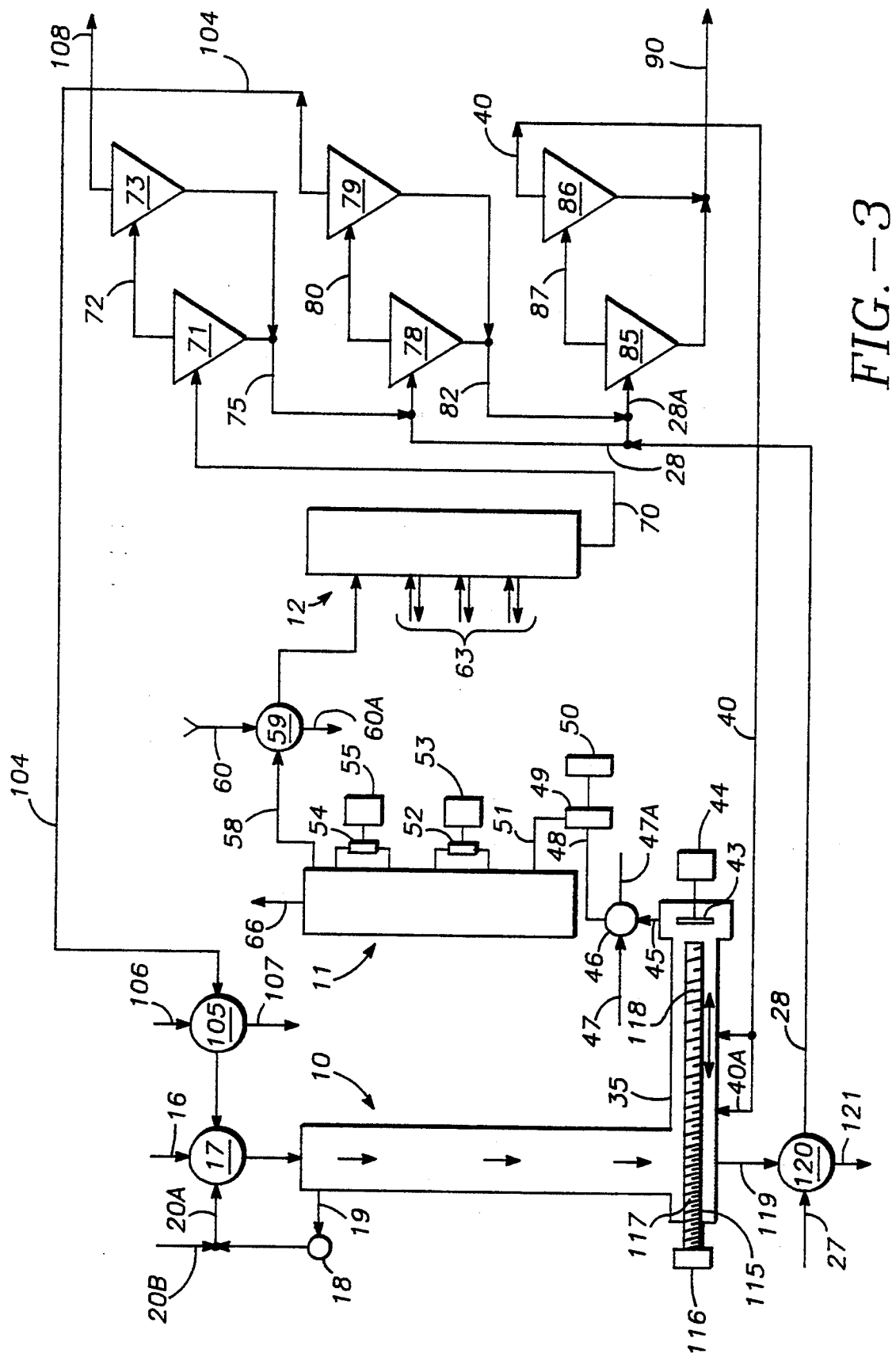
FIG. 3 is a flow diagram of a third embodiment of the invention.

FIG. 8 represents a preferred modification of FIG. 7 and corresponds to FIG. 3 of the Brink and Schaleger patent application.

Figure 1:
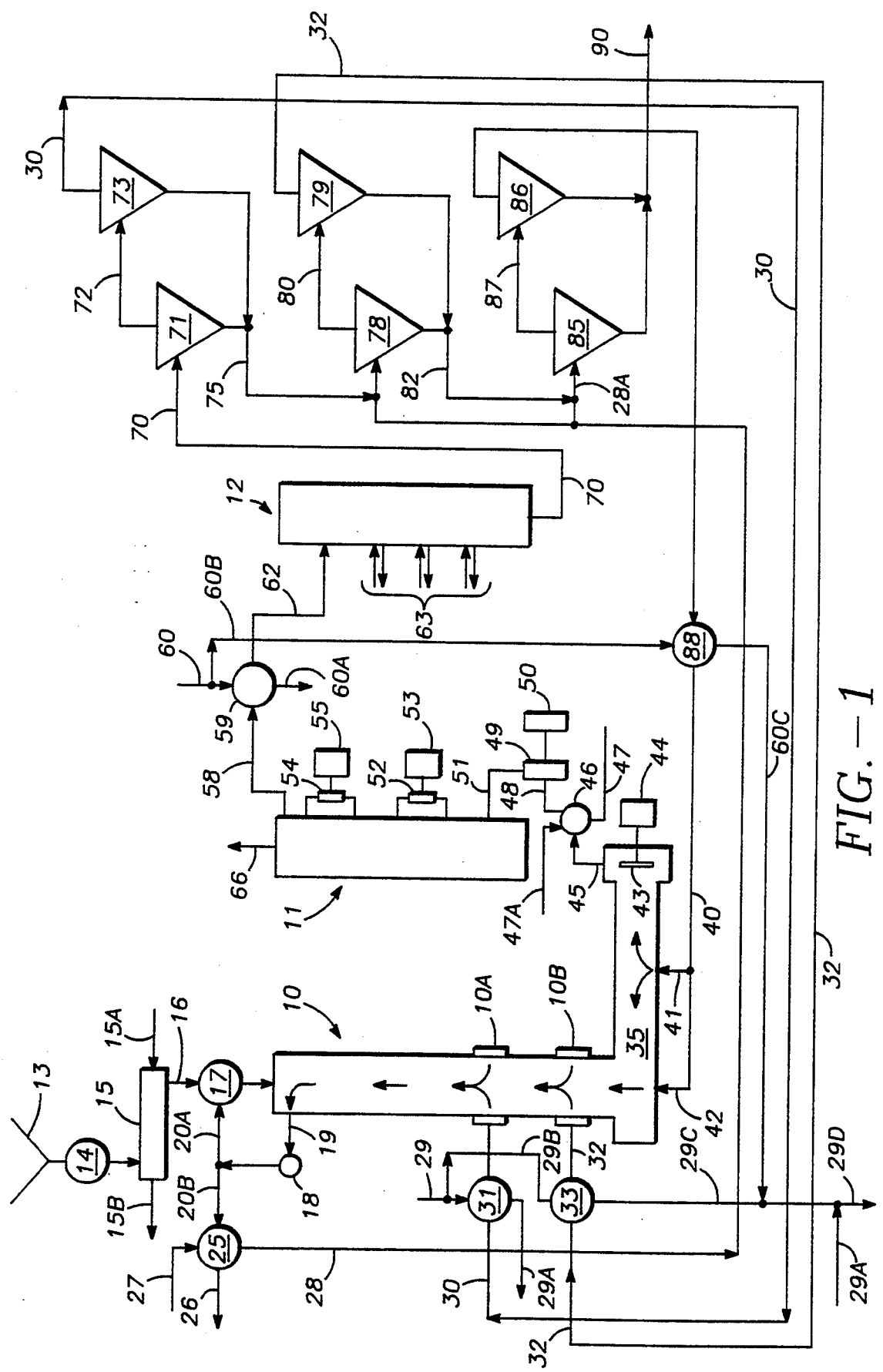
FIG. 1 is a flow diagram of one embodiment of the invention.

Referring now to FIG. 1, major pieces of equipment are a Stage I hydrolyzer 10, a sensitizer 11 and a Stage II hydrolyzer 12. Biomass material stored in hopper 13 is introduced continuously or intermittently according to need by a low pressure rotary valve 14 into a screw conveyor 15 which also functions as a pre-steaming unit by the introduction of steam through a conduit 15A and exits through a conduit 15B. The purpose of this pre-steaming is to remove volatile material and air.

The biomass material may be any sort of polysaccharide, cellulosic or lignocellulosic material such as wood chips prepared from the trunks of trees for use in the manufacture of pulp for papermaking; forest waste such as stumps, roots, branches and foliage which is suitably comminuted, agricultural waste such as orchard and vineyard trimmings, the stalks and leaves of grasses, such as rice, wheat and corn and of cotton plants; grain such as corn, rice and wheat, bagasse and all manner of polysaccharides.

The biomass material descends by gravity through a conduit 16 to a high pressure rotary valve 17 and is metered by this valve to the upper part of Stage I hydrolyzer 10. Stage I hydrolyzer 10 is supplied as described hereinafter with recycle streams which move upwardly while the biomass material moves downwardly. Liquid phase is pumped by pump 18 through line 19 to a T. Part of this stream is recycled through line 20a to rotary valve 17 and part is passed through line 20b to a heat exchanger 25 and leaves the system through line 26 for treatment as desired, for example, fermentation and further treatment as described in copending application Ser. No. 23,338 and in connection with FIG. 4 below. An aqueous recycle stream such as from the methanation unit of Ser. No. 23,338 enters through line 27 and passes through the heat exchanger 25 where it is heated by indirect heat exchange with the stream of hydrolysate. The heated recycle stream then passes through line 28 for processing as described hereinafter. A recycle stream passing through line 30 and consisting of an aqueous solution of glucose derived from second stage hydrolysis as described hereinafter passes through heat exchanger 31 into a mid-section of Stage I hydrolyzer 10, being heated by steam entering through line 29 and leaving through line 29A. As indicated, the heated stream of hydrolysate enters Stage I hydrolyzer 10 through a circular manifold 10A, such that it is uniformly distributed about the circumference of Stage I hydrolyzer and by flow control around the unit is directed upwardly. Another recycle stream 32 enters a heat exchanger 33 and is heated by steam entering through branch line 29B and leaving through line 29C. The heated recycle stream enters the lower portion of Stage I hydrolyzer 10 through a manifold 10B. The origins and significance of the recycle streams 30 and 32 are explained herein below.

Steam and/or condensate from the heat exchangers 31 and 33 leave the system through line 29D for further utilization as desired.

Undissolved biomass material subjected to first stage hydrolysis then enters tube 35. The tube 35 may be a continuation of hydrolyzer 10. A recycle stream in line 40 enters the tube 35 at two different points, one being through branch line 41 more remote from the bottom of hydrolyzer 10 and the other being through line 42 closer to the bottom of hydrolyzer 10. As indicated by the arrows the solid material, propelled if need be by suitable means such as a screw conveyor, moves to the right as viewed in FIG. 1. That portion of the recycle stream entering through line 42, proceeds predominantly upwardly through Stage I hydrolyzer 10 while that portion of the recycle stream entering through line 41 diverges, part flowing to the left, thence into hydrolyzer 10 and part flowing to the right with the solids to an in-line disintegrator 43 driven by a motor 44. The in-line disintegrator 43 may be any of various types such as a pair of mating notched plates one of which rotates while the other is stationary. The purpose of this disintegrator 43 is to disintegrate solids which are not dissolved in the first stage hydrolysis.

The in-line disintegrator serves to fragment the solid material, which has been weakened and pre-disposed to such mechanical comminution by the Stage I hydrolyzer. Thus a finely divided material presenting a large surface area proceeds through line 45 to a gas sparger unit 46 into which air or other gas containing molecular oxygen is introduced through line 47. The material then moves through line 48 to a slurry pump 49 driven by a motor 50 and proceeds thence by way of line 51 to the bottom of sensitizer unit 11. Slurry pump 49 brings about further intimate contact of air with the solids. Acid is introduced into sparger unit 46 through line 47a.

Within the sensitizer unit 11, additional agitation may be provided by a pump agitator 52 driven by a motor 53. At a higher level further agitation is provided by a turbine agitator 54 driven by a motor 55.

It will be understood that other means of agitation well known in the art may be employed in place of the pump agitator 52 and the turbine agitator 54, e.g., an agitator within sensitizer 11 driven by a sealed shaft extending into sensitizer. This agitation would augment that provided by the rising body of dispersed air in the sensitizer. Gas accumulates at the top of sensitizer 11 and is vented through line 66.

The sensitized biomass material then passes through line 58 to a heat exchanger 59 supplied with steam through the line 60. The cooled steam and/or condensate leaves the heat exchanger through line 60A. Heated biomass material in the form of a slurry passes by way of line 62 to an upper portion of Stage II hydrolyzer 12. At different levels lines 63 indicate the entry and exit of material from and to pumps or agitators (not shown) which serve to augment agitation and intimate contact between the solids and the liquid. Solid material together with the retained liquid pass by way of line 70 to a series of separators illustrated as being of the cyclone type but which may be of other types such as centrifuges or decanters. The slurry in line 70 may be cooled by suitable means (not shown) to minimize degradation of monosaccharides, such being done before the separating which will now be described.

The slurry from Stage II hydrolyzer 12 enters the top of cyclone separator 71. Separated liquid leaves through line 72 to a second similar cyclone separator 73. Separated liquid leaves separator 73 by recycle line 30 to heat exchanger 31. Thickened solids leave the lower portions of separators 71 and 73 through line 75 and are joined by the aqueous recycle (wash) stream in line 28. The joined streams pass into the first of two cyclone separators 78 and 79. Liquid separated by separator 78 passes by way of line 80 to the upper portion of separator 79. Liquid separated by separator 79 enters recycle line 32. Solids from separators 78 and 79 pass by way of line 82 to join a branch 28A of recycle line 28 and enter the first of two cyclone separators 85 and 86. Liquid from the upper portion of the first separator 85 leaves by way of line 87 and enters the second separator 86. Liquid separated by separator 86 enters recycle line 40 and passes through a heat exchanger 88 supplied with steam through line 60B. The heated recycle stream enters conduit 35 as described above. Cooled steam and/or condensate leaves through line 60C. Solids from the lower portions of separators 85 and 86 leave the system through line 90. The solids in this stream consist primarily of lignin if the biomass feed material is lignocellulosic. If the biomass material is cellulosic without lignin the solids consist of other difficultly hydrolyzable material. These solids may be subjected to wet oxidation as described in application Ser. No. 23,338 or they may be otherwise treated.

Referring now to FIG. 2 an alternative embodiment of the invention is illustrated. In this figure like reference numerals indicate lines and equipment which are identical to lines and equipment in FIG. 1.

The following changes are made as compared to FIG. 1. Hydrolysate is withdrawn from the bottom of first stage hydrolyzer 10 through line 100 and passes through heat exchanger 101 and leaves the system through line 102, e.g., for fermentation in the system of FIG. 4. An aqueous recycle stream 27 passes through heat exchanger 101 as in FIG. 1 except that heat exchanger 101 is placed differently in relation to hydrolyzer 10; i.e., heat exchange is between a recycle stream and hydrolysate from the bottom of the hydrolyzer. The recycle stream 19, 20A is retained but is not divided. The effluent liquid from separator 79 passes by way of line 104 to heat exchanger 105, thence to rotary valve 17. Acid is added through line 103 to recycle line 20A or through line 104a to line 104 or through both lines 103 and 104a. Heat exchanger 105 is supplied with steam through line 106 which leaves through line 107. The liquid effluent from separator 73 leaves the system through line 108. Where the feed material entering through line 16 is lignocellulosic the effluent in line 108 is predominantly an aqueous solution of glucose which may be further processed as described below in connection with FIG. 4.

Referring now to FIG. 3, reference numerals which are the same as in FIG. 1 indicate identical equipment and lines and reference numerals which are the same as in FIG. 2 indicate identical lines and equipment. Changes in FIG. 3 are as follows: Conduit 35 is provided with a screw conveyer or screw press comprising a shaft 115 driven by a motor 116 and which has helices 117 and 118. As indicated the pitch of the helix 118 is greater than the pitch of the helix 117, the purpose of which is as follows. Recycle line 40 recycles liquid which is dilute in sugars from separator 86 to the end of tube 35 remote from Stage I hydrolyzer 10, as in FIGS. 1 and 2 but a portion of this recycle stream is diverted and proceeds by line 40a to a point nearer the hydrolyzer 10. The smaller pitch at 117 causes a greater quantity of liquid to be expressed from the material and this expressed liquid leaves through line 119 as product. The thickened, higher solids material is then loosened up or rendered less dense by the greater pitch of helix 118, and liquid is added through line 40 sufficient to provide a mixture suitable for disintegration, etc. as described above. The expressed liquid in line 119 gives up heat in heat exchanger 120 to recycle liquid in line 27 which passes by line 28, etc. to the separator system as described above.

Referring now to FIG. 4, there is shown an hydrolysis wet oxidation system together with a fermentation-rectification-methanation system such as described in Ser. No. 23,338, but with certain modifications as described hereinafter.

Referring to FIG. 4, a stage I hydrolysis unit 130, a sensitization unit 131 and a stage II hydrolysis unit 132 are shown. These may be similar or identical to the units 10, 11 and 12, respectively, of FIG. 1 and may be provided with auxiliary equipment for agitation, disintegration, sparging, etc., as in FIG. 1. Biomass material enters stage I hydrolysis unit 130 through line 134 and water or dilute hydrolysate to form a slurry is introduced through line 135. Effluent material, both solid and liquid, leaves stage I hydrolysis unit 130 through line 136 and enters a disintegrating unit 137 which serves to disintegrate the solid material which, as a result of stage I hydrolysis, is very susceptible to fragmentation and mechanical disintegration. Water as needed is supplied to stage I hydrolysis unit 130 and to the slurry flowing in line 136 through recycle line 136A. Effluent from the disintegrating unit 137 passes by way of line 138 to sensitization unit 131. Acid is introduced into sensitization unit 131 through lines 138A and 138. Oxygen enters this unit through line 139. Gases such as carbon dioxide and nitrogen are vented through line 140 and slurry passes by way of line 141 to stage II hydrolysis unit 132. From that unit the material passes by line 145 to a centrifugation unit 146 from which the separated liquid is recycled by way of line 147 to stage I hydrolysis unit 130. Solids pass by way of line 148 into a first wet oxidation unit 149, from which gases such as carbon dioxide and nitrogen are vented through line 150. Oxygen is introduced, preferably in the form of air, through line 139. Boiler water enters wet oxidation unit 149 through line 151 and steam indirectly produced by the heat generated from the exothermic oxidation reactions in unit 149 leaves through line 152 to be used in the process and/or for other purposes. Effluent slurry leaves through line 153 to methanation unit 170 (see below).

Returning to stage I hydrolyzer 130, hydrolysate leaves stage I hydrolysis unit 130 through line 155 and enters neutralization unit 156 to which a base such as calcium hydroxide and nutrients such as phosphate, ammonia, etc. are added through lines 157A and 157B, respectively. The base is added to neutralize acids so that fermentation can take place. Nutrients are added to promote fermentation. Solids resulting from neutralization of acid are removed through line 177 for further processing as described below.

The neutralized liquid hydrolysate leaves neutralizer 156 through line 159 and passes into fermentation unit 160. Products of this unit are carbon dioxide, which is separated through line 161, excess yeast which is separated through line 162 and beer which is separated through line 163 and is passed to rectification unit 164. Ethanol, for example, 95% ethanol, is removed through line 165. The residue leaves rectification unit 164 through line 166 and passes into methanation unit 170 wherein, by processes well known in the art, carbon dioxide and methane are produced which leave through line 171. See "Anaerobic Waste Treatment", Public Works, published in September, October, November and December, 1964 issues, pages 107–112, 123–126, 91–94 and 95–99, respectively. Liquid and undissolved solids leave methanation unit 170 through line 172 and pass into separation unit 173. Liquid separated in unit 173 provides recycle aqueous phase which leaves through line 174. Part of this liquid phase proceeds as described above through line 136A to stage I hydrolysis unit 130 and disintegrator 137. Another part passes into separator 146. Excess not needed for these purposes is removed from the system through line 175.

Solids together with retained liquid phase pass from separation unit 173 through line 176 to sterilization (not shown) and to neutralizer 156. These solids will include insoluble salts of calcium, principally calcium carbonate, which results from the action of methanation on soluble calcium salts in the methanation unit 170. The calcium carbonate thus introduced into neutralization unit 156 serves as the principal agent for neutralizing acids. The calcium hydroxide or calcium oxide added through line 157A is for make-up. The calcium hydroxide and/or oxide and the calcium carbonate function to neutralize acid in the hydrolysate. Insoluble calcium salts are precipitated and are separated together with other solids, for example such wood fines as may be present, and together with retained liquid, pass through line 177 to secondary wet oxidation unit 180 supplied with air through line 139A. In secondary wet oxidation unit 180 the solids are converted to soluble material which is passed through line 181 to sensitization unit 131. Alternatively, liquid from secondary wet oxidation unit 180 may pass through line 181A to methanation unit 170. Another alternative is to pass the solids and retained liquids from neutralization unit 156 directly to wet oxidation unit 149 thereby eliminating secondary wet oxidation unit 180. Factors which govern the choice of one of these alternatives are described below. Carbon dioxide is vented from wet oxidation unit 180 through line 182.

Referring now to FIGS. 5A and 5B a Stage I hydrolysis unit 200, a sensitization unit 201 and a Stage II hydrolysis unit 202 are shown. These may be similar or identical to the units 10, 11 and 12, respectively, of FIG. 1 and may be provided with auxiliary equipment for agitation, disintegration, refining, sparging, etc. as in FIG. 1. Biomass material enters Stage I hydrolysis unit 200 through line 203. Water, dilute acid or dilute hydrolysate, as needed, is introduced through line 204. Recycled hydrolysate is introduced through line 205. The water introduced with the biomass material and water introduced through lines 204, 205 and 206 provide a slurry. Effluent material, both solid and liquid, leaves Stage I hydrolysis unit 200 through line 206A and enters a disintegration unit 207 which serves to disintegrate the solid material which, as the result of Stage I hydrolysis, is very susceptible to fragmentation and mechanical disintegration. Effluent from the disintegration unit 207 passes by way of line 208 to sensitization unit 201. Oxygen, usually in the form of air, enters this unit through line 209. Gases such as carbon dioxide and nitrogen are vented through line 210 and slurry passes by way of line 215 to Stage II hydrolysis unit 202. From that unit the material passes by line 216 to a separation (e.g., centrifugation, decantation or filtration) unit 217. Separated liquid passes through line 205 to Stage I hydrolysis unit 200. Solids in the form of a slurry pass by way of line 218 into a first wet oxidation unit 219, from which gases such as carbon dioxide and nitrogen are vented through line 220. Oxygen is introduced, preferably in the form of air, through line 209A. Boiler water enters wet oxidation unit 219 through 225 and steam produced by the exothermic oxidation reactions in unit 219 leaves through 226 to be used in the process and/or for other purposes. Effluent slurry leaves through line 227 to solids separation zone 228. Aqueous phase leaves solids separation zone 228 through line 229 and separated wet solids leave through line 230. Line 229 goes to methanation unit 269 (see below). Alternatively the aqueous solution of organic acids in line 229 or a portion thereof is introduced to stage I hydrolysis 200.

Returning to Stage I hydrolyzer 200, hydrolysate leaves Stage I hydrolysis unit 200 through line 231 and enters neutralization unit 232 to which a make-up base such as calcium carbonate and make-up nutrients such as phosphate, ammonia, etc. are added through lines 233 and 234, respectively. The base may be calcium hydroxide, calcium oxide, magnesium carbonate, magnesium oxide or mixtures thereof. The base is added to neutralize acids and to adjust pH so that fermentation can take place. Nutrients are added to promote fermentation. The slurry leaves neutralizer 232 through line 235 to a secondary neutralization zone 240 where calcium oxide or calcium hydroxide is added through line 241 to complete neutralization and adjust pH to that required in fermentation. The slurry, after final pH adjustment, is passed through line 242 to a solids separation zone 243. The solids resulting from neutralization of acids are removed through line 244 for further processing as described below.

The neutralized liquid hydrolysate leaves solids separation zone 243 through line 245 and passes into solvent extraction unit 246 (see FIG. 5B). The solvent extract is sent by line 247 to solvent recovery unit 248. In solvent recovery unit 248 toxic and other extractable materials are isolated and recovered with an aqueous phase through line 249 as extract. The recovered solvent from recovery unit 248 is passed through line 250 to solvent storage unit 255. The solvent is sent through line 256, as needed, to the extraction unit 246. Raffinate from the extraction unit 246 is sent by line 257 to solvent stripping unit 258. Steam is supplied through line 259 to strip the solvent from the aqueous sugar solution and, together with vaporized solvent, is removed through line 260. The distillate in line 260 is introduced into solvent recovery unit 248. The sugar solution from solvent stripping unit 258 is sent by line 261 to the fermentation unit 262. Products of this unit are carbon dioxide, which is separated through line 263, excess yeast, which is separated through line 264, and beer which is separated through line 265, and is passed to rectification unit 266. Alternatively, fermentation and rectification may be carried out simultaneously according to Blanch and Wilke. Ethanol, for example, 95% ethanol, is removed through line 267. The residue leaves rectification unit 266 through line 268 and passes into methanation unit 269 wherein, by processes well known in the art, carbon dioxide and methane are produced which leave through line 270. See "Anaerobic Waste Treatment", Public Works, published in September, October, November and December, 1964 issues, pages 107–112, 123–126, 91–94 and 95–99, respectively. Liquid and undissolved solids leave methanation unit 269 through line 275 and pass into separation unit 276. Liquid separated in unit 276 leaves through line 277. The major portion of this liquid proceeds through line 278 and is combined with solid slurry in line 244 from solids separator 243 and proceeds through line 279 to the secondary wet oxidation unit 280. Water discarded from the system leaves through line 277A. Air is supplied to the secondary wet oxidation unit through line 209A. Gases from the secondary wet oxidation unit 280 are removed through line 281 and, together with gases in line 220, leave through line 282 and are utilized for heat and power generation. Alternatively the gases in line 281 and the gases in line 220 may be used separately for such purpose. The liquor and suspended solids from wet oxidation unit 280 pass through line 283 and are combined with a similar stream in line 230 from first stage wet oxidation described above. The combined streams pass through line 284 and are subjected to solids separation in unit 285. A part of the clarified aqueous stream proceeds through line 206 to wash and convey solids in and issuing from Stage 1 hydrolysis as described for line 27 in FIGS. 1 to 3 and line 136A in FIG. 4. The remaining aqueous phase, containing suspended solids, is conveyed through line 286, and serves as wash water in solids separation and washing unit 217 previously described.

A portion of the solids together with retained liquid phase pass from separation unit 276 through line 288 to neutralizer 232 wherein acids are neutralized with the evolution of carbon dioxide. The remaining slurry is conveyed through line 290 to lime kiln 295 where organic acids and other organic matter are combusted and calcium carbonate (or magnesium carbonate) is converted to calcium oxide (or magnesium oxide). The calcium or magnesium oxide is conveyed, as needed, through line 241 to neutralization unit 232.

The sequence of neutralization and then extraction may be reversed in order to isolate organic acidic material by introducing into line 231 an appropriate alcohol, in particular either ethanol or methanol (which are products of the process) or butanol (which is used in extraction). This will produce the corresponding esters of organic acids which are removed by distillation and condensation and constitute products of the process. Acids forming volatile esters such as acetic and formic acid esters are recovered by introducing partially water miscible alcohols such as n-butanol, isobutyl alcohol or pentanols. Some acidic materials as well as neutrals are extracted. The products are recovered through a cycle similar to that described above with reference to units 246, 248, 255 and 258.

This alternative procedure will result in a raffinate which contains fermentable sugars. This raffinate is then neutralized as in 232 and 240 and is subjected to solids separation as in 243 and the liquid is then subjected to fermentation and distillation as in 262 and 266. The solids separated from neutralized raffinate are then subjected to wet oxidation as in 280.

The stream in line 229 contains organic acids and these may be similarly treated with an alcohol to form the corresponding esters which in turn may be recovered by solvent extraction, etc. as described above. Therefore these products of value are recovered rather than carrying out their methanation in methanation unit 269. The raffinate resulting from such extraction is then subjected to methanation in unit 269.

General Discussion

As noted above, various inorganic substances are added to the system to adjust pit (either to acidify or to neutralize) or to flocculate and to provide nutrients for fermentation. Certain of the inorganic substances, especially ferric iron or aluminum, also function to catalyze hydrolysis in Stage I and Stage II hydrolyzers 200 and 202 and wet oxidation in wet oxidation unit 219. These substances may be added at suitable points, for example, calcium carbonate may be added through line 233 and nutrients through line 234. Acid may be added, for example, through line 47A to the sparger 46. The acid may be any mineral acid, for example, sulfuric acid, hydrochloric acid, nitric acid, an acidic salt such as aluminum sulfate, ferric sulfate, aluminum nitrate or ferric nitrate. Nitric acid is preferred because it provides a nutrient for fermentation and because it is less corrosive to steel equipment than sulfuric and hydrochloric acids.

Referring to FIG. 1, the flow of liquid (recycled hydrolysate) in first stage hydrolyzer 10 is countercurrent to the flow of solids and is preferred where the solids are relatively coarse or dense such that they will sink notwithstanding countercurrent flow of liquid. (It will be understood, of course, that the downwardly moving solids carry liquid with them.) When the solids are of small particle size and/or of low packing or bulk density such that countercurrent flow is difficult or impractical, co-current flow may be used as in FIGS. 2 and 3.

As an alternative to the flow through second stage hydrolyzer 12 as shown in FIG. 1 and other figures, the slurry from sensitizer 11 may be caused to enter hydrolyzer 12 at the bottom and hydrolysate may be removed from the top. This has the advantage that the yield and concentration of sugars is increased. It is believed that this is due to the following:

Large particles of solids move downwardly faster in a downward flow and upwardly slower in an upward flow than the liquid phase and the finer particles. Therefore in the downward flow as shown in FIG. 1 the large particles will have a shorter residence time in hydrolyzer 12 and will be exposed to hydrolytic action a shorter time. If the slurry is introduced into the bottom of hydrolyzer 12 and is caused to move upwardly the larger particles will move upwardly more slowly. When a steady state is reached, and apart from the effect of hydrolysis on particle size, as many large particles will leave as enter the hydrolyzer 12, but each individual particle will have a longer residence time in hydrolyzer 12. Also differential velocities of liquid phase and large particles in this preferred embodiment are more efficient in extracting sugars from the large particles.

This preferred embodiment is also applicable to FIGS. 2, 3, 4 and 5A.

Referring to FIG. 5, appropriate flow of material (countercurrent or co-current) will be employed in first stage hydrolyzer 200 in accordance with the considerations described above.

In FIG. 1, it will be seen that concentrated hydrolysate recycled material (that is, hydrolysate which is most concentrated with respect to sugars) emanating from separator 73 is conducted through line 30 to a portion of Stage I hydrolyzer 10 nearer its inlet, while more dilute hydrolysate from separator 79 is recycled through line 32 to a point further down hydrolyzer 10. The least concentrated hydrolysate, that emanating from separator 86, passes through line 40 and is divided, part of it going into the bottom of hydrolyzer 10 and part of it acting to dilute the solids to put them in a more suitable form for disintegration by the disintegrator 43. This recirculation and recycling system improves efficiency in the use of the hydrolysates. Thus the most concentrated recycled hydrolysate is put through the first stage hydrolyzer at a point where it is subjected to a minimum of exposure to heat, which has a tendency to degrade the sugars. The product (other than lignin) of this system is a hydrolysate leaving through line 26 containing glucose and also pentoses, the latter being derived mainly from the hemicellulose content of the biomass material. The system described lends itself to maximizing the yield and concentration of these monosaccharides.

In FIG. 2, hydrolysate separated from the system through line 102 has a maximum concentration of sugar derived from hemicelluloses. Hydrolysate removed through line 108 has a maximum concentration of glucose derived from cellulose in second stage hydrolyzer 12. A less concentrated hydrolysate is recycled through line 104 to hydrolyzer 10. This minimizes mixture of glucose with pentoses so that two hydrolysates constitute end products of the system, one predominating in pentoses derived from hemicellulose, the other consisting largely of glucose derived from cellulose.

Part of the hydrolysate leaving hydrolyzer 10 through line 102 may be recycled to the top of the hydrolyzer and part of the hydrolysate leaving through line 108 may be recycled to the top of hydrolyzer 12. The purpose of such recycling would be to increase the concentration of sugars in the hydrolysate leaving the system but such recycling will expose the recycled sugars to degradation. An optimism balance between increased concentration and increased degradation will be employed.

Referring to FIG. 3, hydrolysates are withdrawn from the system through lines 121 and 108. As in FIG. 2, a relatively more concentrated hydrolysate (less concentrated than product withdrawn through line 108) is recycled from separator 79 through line 104 to the top of first stage hydrolyzer 10 and the most dilute hydrolysate leaves separator 86 through line 40 and is recycled to tube 35 and where it acts to wash solids relatively free of sugars, which leave through line 121. Another portion of this more dilute hydrolysate is employed to dilute the solids before they reach the disintegrator 43.

Referring to FIG. 5, the solvent extraction and recovery system at 246, 248, 255 and 258 serves to remove organic substances such as furfural, terpenoids, etc., which inhibit fermentation.

Ferric iron or aluminum salts added to this system, in addition to acting as catalysts also produce flocculent precipitates which aid in bringing down finely dispersed solids which are subjected to oxidation in the secondary wet oxidation unit 280.

Referring again to FIG. 1, as stated above acid, preferably nitric acid, is added through line 47a to the system at the sparger 46. This has the advantage of making the mixture more strongly acid after first stage hydrolysis has been accomplished and also at a time when the solids are in very finely divided form, such that the acid can act more readily upon them. The acid in diluted form is recycled through lines 30, 32 and 40 and act to maintain a suitable pH, for example, 2 to 3 in the first stage hydrolyzer 10. The liquor in line 30 may also be taken as a product with only the liquors in lines 32 and/or 40 being recycled.

Referring to FIG. 3, all or any portion of the hydrolysate in line 104 may be diverted to line 108.

As stated above in connection with FIG. 4 solids resulting from neutralization in unit 156 may be treated in several different ways. One way is to treat them in secondary wet oxidation unit 180 and introduce the liquid product into sensitizer 131. Another way is to introduce the liquid product of wet oxidation from secondary wet oxidation unit 180 into methanation unit 170. A third way is to eliminate secondary wet oxidation unit 180 and to introduce the solids and retained liquid from neutralization unit 156 into wet oxidation unit 149. Factors governing the choice of the method of treating the solids from neutralization unit 156 are as follows:

(1) If a flocculating acidic material such as ferric or aluminum nitrate, sulfate or acetate is added, for example, through line 138a, it will enter hydrolysis unit 130 through recycle line 147 and will pass through line 155 into neutralization unit 156 where metallic ions will be precipitated as the hydrous oxides which will serve to flocculate solids suspended in the liquid and to precipitate these solids which then leave through line 177 to secondary wet oxidation unit 180 where the organic material is oxidized to organic acids such as acetic acid. The metallic ions are redissolved as salts of such acids. The soluble salts are then introduced through line 181 into sensitization unit 131 and function there and in second stage hydrolysis unit 132 and wet oxidation unit 149 as catalysts for sensitization, hydrolysis and oxidation. Part of these soluble salts also enter first stage hydrolysis unit 130 through recycle line 147 and function as catalysts for hydrolysis and pass by way of line 155 to neutralization unit 156 to function again as flocculating agents.

(2) The alternative in which secondary wet oxidation unit 180 is eliminated would serve to simplify the system.

(3) If no iron or aluminum salt is added to the system the effluent liquid from secondary wet oxidation unit 180 may pass through lines 181 and 181A to line 153 to join effluent from wet oxidation unit 149 and the combined streams are introduced into methanation unit 170. This has the advantage that it avoids circulating calcium salts through the first stage hydrolysis-sensitization-second phase hydrolysis-wet oxidation part of the system.

If it is desired to produce organic acids as end products effluent liquid from wet oxidation unit 149 and/or 180 may be withdrawn from the system. The resulting solution of organic acids may be treated to isolate the organic acids and neutrals such as methanol and furfural and the residue may be subjected to methanation in unit 170.

The liquid effluent from secondary wet oxidation unit 180 will contain some solids. These solids may be removed in those alternatives in which the liquid effluent is sent to sensitization unit 131. The separated solids may be sent to methanation unit 170 or to wet oxidation unit 149.

As noted above, first stage hydrolysis of the biomass feed material predisposes the material to disintegration before it is subjected to sensitization and second stage hydrolysis. The feed material to first stage hydrolysis may vary considerably in size. For example, it may be in the form of wood chips of the type which provide the feed stock for a paper mill. Average particle sizes of about minus 1 to minus 20 mesh are suitable.

Referring now to the embodiments of FIGS. 6, 7 and 8 (corresponding to FIGS. 1, 2 and 3 respectively of the aforesaid Brink and Schaleger patent application), such embodiments are applicable to all manner of forest products including particularly material which is otherwise waste such as saw mill residues, cull logs, products of thinning forests, sawdust, bark, etc.; it includes, among forest products, softwoods, e.g., firs, pines, junipers, cedars, true firs, Douglas fir and redwood, and hemlock, hardwoods such as oak, aspens, cottonwood, poplars, maples, mountain mahogany, myrtles, manzanitas and sagebrush; agricultural crop residues such as the straw residues of cereal grains (wheat, barley, oats, rice, etc.), and the residues of other crops such as cotton, orchard trimmings, bagasse, hemp, etc.

Referring now to FIG. 6, biomass material enters the system at 310. By way of example this could be green wood containing approximately equal quantities of lignocellulosic material (oven dry wood) and naturally occurring moisture. This material in suitably comminuted form is introduced into a first hydrolyzer or zone indicated by the reference numeral 311 in which Stage I hydrolysis is carried out. In this hydrolysis unit the biomass material is subjected to an elevated temperature, for example, 140° to 220° C., preferably about 160° to 180° C. The pressure in the hydrolyzer is autogenic being, for example, 75 psi gauge at 160° C. (All temperatures are centigrade.) A recycle line 312 serves an important function in recycling sugars (hexoses) produced in second stage hydrolysis. The object is to increase the concentration of sugars (hexoses) in an aqueous solution which is routed to another part of the system. It is desirable to keep the residence time in hydrolysis zone 311 as short as possible consistent with accomplishing the desired hydrolysis. By way of example in processing white fir at about 160° C. the residence time in zone 311 that gives a maximum reducing sugar yield was 30 minutes and is a function of several variables including pH, particle size, mixing efficiency and species of plant material. In Table I below there is given representative ranges of hemicelluloses, cellulose and ligneous compositions of softwoods and hardwoods. It is the hemicelluloses (glucomannans and glucuronoxylans) and the readily accessible amorphous regions of the cellulose that are hydrolyzed in the first hydrolysis unit to simple sugars (hexoses and pentoses) which in turn are converted to or isolated as useful products such as ethanol, butanol, Torula yeast, methane, methanol, acetic acid and furfural.

TABLE I

|  | Gymnosperms (Softwoods) | Angiosperms (Hardwoods and Grasses) |
|---|---|---|
| Cellulose | 42 ± 3% | 43 = 3% |
| Glucommanans | 20 ± 5% | 4 ± 2% |
| Glucuronoxylans | 12 ± 3% | 27 ± 7% |
| Lignins | 30 ± 5% | 25 ± 5% |

The effluent product from hydrolyzer 311, which is in the form of a slurry, is introduced through line 313 into a separator 314 which may be any of several well known types such as centrifuges or filters that are preferably continuously operating types and are capable of separating solids from liquids. (Reference is made throughout to "lines" and to flow of material through "lines." In the preferred practice of the invention these are in fact conduits through which materials flow, preferably in a continuous manner. However, the effluent from a given piece of equipment may be stored and introduced into the next piece of equipment as needed.) The liquid leaves by way of line 315 and the solids by way of line 316. A recycle line 317 is shown which is primarily for water as needed in the separator 314.

The slurry of solids separated in separator 314 then passes through a refiner 316a which serves to refine the solids so as to make them quite fine, increase their surface area and make them more amenable in the next step which is carried out in sensitizer 318. Air or oxygen and acid are introduced into sensitizer 318 as needed through lines 319 and 320, respectively. In the sensitizer 318 important variables are temperature, residence time, pH, rate of oxygen introduction, degree of dispersion of the oxygen and the particle size of the lignocellulosic material. These variables are interacting and are optimized to maximize production of reducing sugars. A temperature in the range of 140° to 220° C., preferably 160° to 200° C., is maintained in the sensitizer unit 318 and the input of air is preferably admixed at a pressure of 50 to 400 psi above autogenic pressure of the system in a manner to give fine dispersion and in an amount of 0.2 to 4.0 grams of oxygen per minute per kilogram of biomass on an oven dried (O.D.) basis. The acid used may be a mineral acid or it may be an organic acid or acids produced in the process itself which, being one or more of the end products of the system, does not require removal as a waste material but rather is a marketable end product. Further, nitric acid is the acid of preference since it has the advantage that nitrogen compounds derived from the nitric acid provide a nutrient for digestion to consume the biological oxygen demand of effluents discharged from the process step. By way of example, white fir wood of particle size minus $-2+4$, after treatment in hydrolysis zone 311, was sensitized by heating a slurry at pH 2.1 and 170° C. for 60 minutes while sparging with air at a rate of 1.0 gram of oxygen per minute per kilogram of O.D. pre-hydrolyzed wood. The sensitized solids and accompanying liquid are transferred through line 325 to a Stage II hydrolysis unit 326 in which a temperature in the range of 160° to 240° C., preferably approximately 180° to 220° C., is maintained. Spent gas is removed through line 327, such being nitrogen, unconsumed oxygen, other constituents of the air and any gas, such as carbon dioxide and carbon monoxide, produced in the sensitizer.

Heat necessary for the hydrolysis stages including sensitization may be supplied from a source external to the system but preferably steam generated in the system itself is used as described hereinafter with reference to FIG. 7. Also the flow of materials is designed to optimize the use of heat exchange in order to minimize the steam requirements of the system.

The product of the Stage II hydrolysis, which is in the form of a slurry, proceeds by way of line 328 to a separator 329 which may be similar to the separator 314.

Water as needed for displacement or other types of washing solids, and for slurrying of solids in the operation of the separator is provided through recycle line 330. The liquid effluent (an aqueous solution of sugars, both hexoses and pentoses, having a concentration typically of about 1 to 10% of reducing sugars) leaves by way of line 312 as recycle material to go to the Stage I hydrolysis unit. The separated solids (in the form of a slurry) proceed by way of line 331 to a wet oxidation step described hereinafter.

An important feature of the invention is the recycle of liquid material from the separator 329 by way of line 312 to the first hydrolysis unit 311. The first hydrolysis unit functions primarily to hydrolyze hemicelluloses, which are more readily hydrolyzed than cellulose. The hydrolysis products are hexoses and pentoses. Cellulose is hydrolyzed in unit 326 (aided by the pretreatment in sensitization unit 318), the hydrolysis product being predominantly glucose. By reason of the recycle through line 312, the concentration of monosaccharides routed to other parts of the system through line 315 is considerably increased.

As a preferred alternative, the recycle hydrolysis may pass from line 312 to line 312a through hydrolyzer 311 countercurrently to the biomass feed material passing through this hydrolyzer and out through line 312b to line 315.

The solid material is separated in separator 329 as a washed slurry and passes by way of line 331 to a wet oxidizing unit 332 into which air is delivered through line 333. The wet oxidation step carried out in the unit 332 may be, for example, that described in Brink, U.S. Pat. No. 3,562,319. The process is exothermic and a steam coil (not shown) may be provided to heat boiler feed water and generate steam. Gas leaves the wet oxidation unit through line 342, such being unconsumed oxygen, other components of the air and carbon monoxide and carbon dioxide produced in the wet oxidation unit. The product of wet oxidation, which is in the form of a slurry, leaves through a line 343 and is introduced into a separation unit or units 344 in which by a process or succession of processes such as solvent extraction, etc., useful end products such as acetic acid, formic acid, furfural and methanol are separated and may be further separated in fractionation unit or units 345.

The principal function of the first hydrolysis unit 311 is to hydrolyze hemicelluloses to simple sugars (hexoses such as glucose, mannose and galactose and pentoses such as xylose and arabinose) and to complete hydrolysis of oligomers introduced into this unit with hydrolysate from the second hydrolysis unit through line 312 or lines 312 and 312a. The hemicelluloses are the most easily hydrolyzed constituents of lignocellulose. The proportions of hexoses and pentoses depend upon the plant (biomass) material used as raw material as indicated in Table I above. The function of the second stage hydrolysis unit 326 is to hydrolyze the cellulose to glucose and for that purpose a higher temperature and higher acidity, i.e., higher hydrogen ion concentration, are needed. The function of the sensitizer unit 318 is to pre-condition the cellulose with the result, as we have discovered, of increasing the rate of hydrolysis and substantially increasing the yield of glucose. The function of the wet oxidation unit 332 is to break down the lignin to water soluble organic fragments. In each of the units 311 (first stage hydrolysis), 318 (sensitization), 326 (second stage hydrolysis) and 332 (wet oxidation) the purpose is to convert a fraction of the biomass to products which can in turn be converted by methods such as fermentation, extraction, fractionation and methanation to useful end products such as ethanol, acetic acid, formic acid, furfural, methanol and methane. It is an object of the invention to so carry out the process that the yield of these end products is high, the concentration of sugars introduced into the fermentation step is high, and the production of oxidative products such as $CO_2$, $CO$ and degradation products of little value are minimized. To that end in each of the units 311, 318, 326 and 332 the residence time and temperature are balanced so that end products of little or no value are minimized. We have found that at the temperatures indicated residence time of the biomass or partially converted biomass should be as short as possible, generally not more than about 30 minutes and frequently much less.

The first stage hydrolysis, the sensitization and the second stage hydrolysis are shown as being carried out in separate pieces of equipment. However, they may be carried out in a continuous tube.

The circulation of solids out of wet oxidation unit 332 through lines 343, 376 and 379 is optimized to maximize production of acetic acid and other organic products.

Reverting now to the separation of a liquid phase (a solution of sugars) from the hydrolysis-sensitization part of the system, the liquid leaving separator 314 through line 315 is routed to a liquid extraction unit 347. The extract is routed by line 348 to the liquid extraction unit 344, mentioned above, in which acids, etc. are extracted and are then separated as described above. Solvent for these extractions enters through line 349. The raffinate from unit 347 passes by way of line 350 to fermentation unit 351 into which necessary additives such as yeast, nutrients and/or bases to neutralize the aqueous medium to a desired pH for fermentation are introduced through line 352. Solvent extraction in unit 347 removes substances such as furfural which would interfere with fermentation in unit 351.

Excess yeast and other solids (if any) leave fermentation unit 351 by line 353 and $CO_2$ by line 354. The solids may be used as cattle feed, for example. The clarified liquid or beer leaves unit 351 through line 355 to rectification unit 360. Ethanol, e.g., 95% ethanol, leaves the system through line 361 as one of the end products. The still bottoms from rectification unit 360 pass by way of line 362 to methanation unit 363. Methanation may be carried out by any of several well known processes resulting in $CO_2$ and methane which leave by way of line 364 and may be separated. Liquid containing some solids leaves methanation unit 363 through line 365 and is separated into commercially pure water (i.e., water which can be used in the system) and a dilute slurry of solids that have passed through the system without being solubilized and/or have been produced in the system as yeast or bacteria in the biochemical processing steps. Part of the water is recycled through lines 317 and 330 as described above and part is removed from the system through line 368. Make-up water is added as needed at any convenient point in the system, preferably as wash water to separator 329. The dilute slurry passes through line 375 and is recycled to wet oxidation unit 332. Raffinate from liquid extraction unit 344 passes by way of line 376 to separator 377 where aqueous solution is separated and passed to methanation unit 363 through line 378 and a dilute slurry is separated and passed to wet oxidation unit 332 by way of line 379.

The procedure described above with reference to FIG. 6 is applicable to both softwoods and hardwoods. However, when the raw feed material is a hardwood, i.e., angiosperms having low proportion of hemicelluloses which contain hexoses, the hydrolysates from first and second stage hydrolysis may be processed separately. For example, the hydrolysate passing from separator 314 through line 315 (which is rich in pentoses) may be processed to recover furfural, while the hydrolysate in line 312 (which is rich in glucose) may be subjected to fermentation. However, as explained elsewhere in this specification, the hexose rich hydrolysate and the pentose rich hydrolysate may be combined (as they are in FIG. 6) and subjected to simultaneous fermentation (after suitable processing to remove substances which interfere with fermentation) to ethanol, employing a suitable mixture of microorganisms, or the combined hydrolysates may be subjected to sequential fermentation of hexoses and pentoses. Alternatively, solids in the slurry of streams 375, having nutritive value can be separated for appropriate utilization with separated water used as described above.

Referring now to FIG. 7, biomass, for example, green wood from trees or saw mill residues in suitably comminuted form enters the system at 400 and is received in a storage hopper 401. The comminuted wood then proceeds along the path 402 to a first hydrolyzer 403. This is the same hydrolyzer as shown at 311 in FIG. 6 and the temperature and residence time are as described in connection with that figure. Hydrolysate solution also enters the hydrolyzer 403 through the line 404 and recycle wash water through the line 404a. The effluent leaves the hydrolyzer through line 405 and passes through a heat exchanger 406. Typically, in the case of wood from trees, this effluent will consist of an aqueous phase having dissolved therein approximately 30 to 35% of the dry weight of the wood, the remaining 65 to 70% being solids. The effluent slurry leaves the heat exchanger 406 (where it is cooled somewhat below the temperature prevailing in hydrolyzer 403) through line 407 and is introduced into a separator 408 which serves to separate liquid phase from solids. In this instance and in others like it, the separated liquid, apart from traces of solids, is entirely a liquid phase containing dissolved solids. The separated "solids" are actually a slurry of undissolved solids and liquid, the liquid being the same as the separated liquid phase. As is well known, the "solids" must contain a large proportion of liquid to be amenable to pumping through pipes and otherwise handling.

The liquid leaves by line 409 and the solids by line 410. The separator 408 may be of conventional variety such as, for example, one or more centrifuges. The solids leaving through line 410 will typically consist of about 60 to 85% aqueous phase and 40 to 15% solids, and is introduced into a separator-washer 411. Two streams of water from a recycle stream referred to hereinafter are introduced into the separator-washer 411 through lines 416 and 417. The separator-washer 411 may be of well known construction, e.g., a washing centrifuge or drum filter. The portion of the water introduced through line 416 serves to displace and remove, through line 418, a major proportion of the sugar content of the aqueous phase introduced through line 410. This solution, after passing through a heat exchanger 419, passes into line 404a for recycling to the first hydrolyzer 403. Water introduced in line 417 dilutes the washed solids in 411 to a transportable slurry carried in line 420. A slurry of solids passes by way of line 420 through heat exchanger 406 to an agitator 421 and then into sensitizer 422 into which air or oxygen is introduced through line 423 from a source 423a. The function of the agitator 421 is to provide an intimate dispersion of air, solids and liquid which then passes by way of line 424 into sensitizer 422, which corresponds to the sensitizer 318 in FIG. 6 and in which the conditions of temperature and time of residence are as described above in connection with FIG. 6. Acid as needed to control pH in the sensitizer 422 and in the second stage hydrolyzer 435 (see below) enters through line 430a directly into line 431 and also by way of line 430b to agitator 421.

Spent gas (largely nitrogen, carbon dioxide and other, minor components of air) is vented from the sensitizer through line 430 to a gas turbine (not shown) and thence to the atmosphere or if desired to any desired scrubber before or after the gas turbine. A slurry of solids and aqueous liquid leave the sensitizer 422 through line 431 and a cellulose hydrolyzer agitator 432 to a heat exchanger 433 where it is heated to the temperature of hydrolysis and then proceeds by way of line 434 to a second (cellulose) hydrolyzer 435 corresponding to the second hydrolyzer 326 in FIG. 6 and in which temperature and time of residence are as described in connection with FIG. 6. As explained above, in this hydrolyzer the cellulose is substantially broken down into glucose. To the extent that cellulose is hydrolyzed to oligomers, these are further hydrolyzed to glucose by virtue of being recycled through line 404 to hydrolyzer 403. A slurry (an aqueous solution of glucose and solids, largely lignin) passes by way of line 436 through a heat exchanger 437 into a separator 438. A portion, typically about 70 to 90% of the aqueous phase (a solution of glucose) passes by way of line 439 through heat exchanger 437 to line 404 for recycling. (As described above in connection with FIG. 6, this recycled hydrolysate may be passed through hydrolyzer 403 countercurrently to the biomass feed material.) A slurry of solids (largely lignin) and aqueous phase passes through line 440 into separator-washer 441 into which two streams of water enter by way of lines 442 and 443. The wash stream entering through line 442 carries with it a major portion of the aqueous phase which displaces the major part of the hydrolysate remaining with the insoluble ligneous residue. The displaced solution then passes by way of line 444 to line 404. The water entering through line 443 serves to dilute the slurry of solids and contained liquid so that it can be readily passed through line 445 to join another stream (described hereinbelow) to a line 447, then through heat exchanger 448 and line 449 into wet oxidation unit 450. Wet oxidation unit 450 is the same unit as shown at 332 in FIG. 6 and the conditions prevailing therein as regards temperature, time of residence, etc. are as described in connection with FIG. 6. The wet oxidation reactions which occur in unit 450 are exothermic and generate steam in steam coil 455 which passes in part through line 456 for use in the system as described hereinafter. Depending upon the degree of hydrolysis of polysaccharides effected, it would be possible to generate an excess of steam which would then be exported. Air enters the wet oxidation unit through line 432b. Spent gas from the wet oxidation unit 450 leaves through line 458 and joins the stream of spent gas leaving the system through line 430 for venting or scrubbing and venting as described above. A liquid with a controlled amount of solids contained in it passes from unit 450 by way of line 459 through heat exchanger 448 to liquid extraction unit 460. Line 459a recycles liquor to wet oxidation unit 450 to optimize oxidation of solids. The extract from unit 460 passes through line 461 to equipment generally designated as 462 and which may consist of several pieces of equipment, e.g., for steam stripping, for fractionation in a fractionating column, for precipitation, etc. to produce products such as indicated. The raffinate from unit 460 leaves through line 463, then passes through a heat exchanger 464 and by way of line 465 to separator 466 wherein the controlled amount of solids remaining in the liquid (with a suitable quantity of liquid to act as a carrier) passes through line 467 and joins stream 445. Boiler feed water is shown entering the system through line 470 and heat exchanger 464 to steam coil 455 in wet oxidation unit 450.

Reverting now to the aqueous solution leaving separator 408 through line 409, this solution enters liquid extraction unit 480 and passes countercurrently to solvent entering through line 481, the extract leaving through line 482 to liquid extraction unit 460 where it serves as the extraction medium. The purpose of extraction in unit 480 is to eliminate from the solution of fermentable sugars those solutes which would interfere with fermentation, e.g., furfural, and/or to remove organic acids. The purified aqueous solution of sugars is stripped of dissolved solvent in extraction (not shown) and then passes through line 483 to fermenting Unit 484, which is supplied through line 485 with yeast or other suitable microorganism and any nutrient media and base to adjust for pH required for alcoholic fermentation. Insoluble matter is removed before fermentation. Gas (carbon dioxide) leaves through line 486 and the fermented material (beer) through line 487 and heat exchanger 488 to line 487a and then to rectifying column 489. Steam is supplied to column 489 through line 491 and condensate leaves through line 492.

The distillate, for example, 100 proof ethanol leaves through line 490 to be further purified by well known means as an end product and the still bottoms leave through line 500 and pass through heat exchanger 488 to fermentation unit 501 wherein the pentoses and aliphatic acids, as acetic acid, are converted to Torula yeast. Air used in this fermentation is introduced into fermentation unit 501 through line 503 connected to air source 503a. Spent air leaves unit 501 through line 502. The fermentate leaves unit 501 through line 504 and passes to separator 505 from which the aqueous effluent is discharged in line 506 and crude Torula yeast is discharged through line 507. The effluent in line 506 is combined in line 508 with the wet oxidation effluent in line 468 after this effluent is extracted (unit 460). Dissolved solvent in the effluent in line 468 is stripped (not shown) of solvent before it is combined with effluent in line 506. Alternatively, effluent in line 506 may be combined (not shown) with slurry in line 447 and subjected to wet oxidation in unit 450. Line 508 introduces spent effluents to the anaerobic digestion (methanation) unit 509. Methane and $CO_2$ generated in methanation unit 509 leave through line 510. The gaseous mixture may be used as a fuel or the methane and carbon dioxide may be separated. Effluent leaves methanation unit 509 through line 511 to aerobic digestion unit 512. Optionally, the effluent in line 511 is first passed to a solids separation unit (not shown) and solids separated in this unit are recycled to wet oxidation unit 450 by introduction into line 447. The effluent separated is introduced into unit 512 along with sparged air from line 503b supplied by line 503a from an air source. The treated effluent from unit 512 is discharged through line 513 to separation unit 514. When solids are separated (option described above) before anaerobic digestion in unit 512 the solids separated in unit 514 and discharged through line 515 constitute a crude single cell protein product. When solids are not separated before aerobic digestions in unit 512 the product separated in line 515 is recycled to wet oxidation or is otherwise utilized.

Effluent from separation unit 514 is, for the most part, simply water which passes through line 516 to line 518 and is recycled to the system through lines 416 and 417 (to separator 411) and lines 442 and 443 (to separator 441).

Make-up water (as needed) may be added to the system at any convenient point, e.g., by introducing it into line 417 and/or line 443. Water is removed from the system through line 517 to prevent build-up of solutes.

Alternatively, the fermentables in 501 may be converted to Torula yeast or butanol/acetone/ethanol or ethanol or other products by selection of an appropriate type of fermentation. Another alternative is to ferment the hexoses selectively in unit 484 to produce Torula yeast or butanol/acetone/ethanol and then to convert the pentoses by acid dehydration (not shown) to furfural. Recovery of the various products and recycle of spent streams will be carried out as described using appropriate modifications of the system described above for production of Torula yeast and furfural.

Alternatively, the fermentables in 501 may be converted to Torula yeast or butanol/acetone/ethanol or ethanol or other products by selection of an appropriate type of fermantation. Another alternative is to ferment the hexoses selectively in unit 484 to produce Torula yeast or butanol/acetone/ethanol and then to convert the pentoses by acid dehydration (not shown) to furfural. Recovery of the various products and recycle of spent streams will be carried out as described using appropriate modifications described above for production of Torula yeast and furfural.

Referring now to FIG. 8, this is a flow diagram of a modification of the flow diagram of FIG. 7 centering about the first stage hydrolysis unit (numbered 403 as in FIG. 7) and illustrating a different, and preferred method of recycling the hydrolysate from the second stage hydrolysis. Wherever in FIG. 8 a line is interrupted (the interruption being indicated by a zig-zag terminus), it is to be understood that such line connects to other equipment (not shown in FIG. 8) as in FIG. 7.

Lignocellulosic raw material suitably comminuted, enters from hopper 401 and passes through a continuous feed device 520. This may be a screw type feed or a rotary feed. The material passes into first stage hydrolyzer 403 and passes downwardly countercurrently to up-coming liquid described hereinafter. (The arrangement need not be vertical; e.g., it may be horizontal, but a vertical arrangement is convenient.) The partially hydrolyzed material (solid and liquid) passes through line 521 and a refiner 522 to line 523, then through heat exchanger 519 to agitator 421 thence to sensitizer 422. Hydrolysate solution from second stage hydrolysis unit 435 (see FIG. 7) passes through line 404 to a point between the top of hydrolyzer unit 403 and stream 527, as indicated by curved arrows, where it is distributed about the circumference of the downwardly moving, partially hydrolyzed mass of solids and moves upwardly and countercurrently to the solids. Wash water from line 518 (see FIG. 7) is split into two streams 524 and 525 (which correspond to lines 417 and 416, respectively, in FIG. 7). That portion of the wash water entering through line 525 passes through heat exchanger 526, then through line 527 into the bottom portion of hydrolyzer 403 below the level where the hydrolysate enters through line 404. As in the case of the hydrolysate a distributor is employed and the liquid moves upwardly, joining the hydrolysate, counter-currently to the down-coming solids. Recycle wash water entering through line 524 passes into the bottom of hydrolyzer 403 where part of it moves upwardly to join the other stream counter-currently to the down-coming solids and part passes from the hydrolyzer 403 with the solids through line 521. A connecting line 528 connects line 527 with line 524. The portion of wash water thus entering through line 528 is heated by steam in heat exchanger 526. By proportioning the streams 524 and 528, the temperature of the liquid entering the bottom of the hydrolyzer unit 403 can be adjusted. Steam enters heat exchanger 519 from line 456, then passes through heat exchanger 526 and connects to line 491. Steam generated within the system or from outside the system may be introduced as needed, e.g., into line 456 and/or the steam into heat exchanger 526.

Effluent liquid from the top of hydrolyzer 403 passes by way of line 529 and part is recycled by line 530 and feed device 520 to hydrolyzer 403 and another part passes by way of line 531 to a heat exchanger (not shown) and thence to liquid extraction unit 480.

By reason of the modification of FIG. 8 certain advantages are achieved. The down-coming partially hydrolyzed solids in the biomass are washed and sugars are extracted; the washing liquid (streams 404, 527 and 524 {in part}) are cooled, giving up their heat to the solids; and the dissolved sugars passing up with the combined streams are subjected to high temperatures for a short time, which minimizes degradation. Heat in streams 404, 527 and 524 is adjusted to optimize temperature for hydrolysis.

GENERAL DISCUSSION OF THE SYSTEM OF FIGS. 6, 7 AND 8

The system thus described and illustrated comprises an hydrolysis-sensitization sub-system, a wet oxidation sub-system and a fermentation-methanation sub-system and certain recovery steps. In the hydrolysis-sensitization sub-system, primary hydrolyric operations are performed which break down high molecular weight polysaccharides (cellulose) and lower molecular weight polysaccharides (hemicelluloses) into monosaccharides (hexoses and pentoses) by a process of depolymerization. In the wet oxidation sub-system a more drastic oxidative attack (yet sufficiently mild to minimize production of carbon dioxide, carbon monoxide and water) is performed on the structure of lignin to break it down into low molecular weight organic substances of commercial value such as organic acids (typically acetic acid and formic acid), furfural and methanol while minimizing production of $CO_2$, CO and $H_2O$. The fermentation-methanation phase is described above with particular reference to fermentation of hexoses to ethanol, the conversion of pentoses to Torula yeast or other products, and the conversion of other organics by methanation to methane, and the conversion of residual organics to single cell proteins by aerobic digestion. However, by using a suitable mixture of microorganisms both hexoses and pentoses in admixture may be fermented to ethanol or hexoses may be fermented to ethanol with suitable microorganisms and pentoses may then be fermented to Torula yeast or butanol/acetone/ethanol or ethanol separately by other microorganisms. Also, hexoses can be fermented to Torula yeast and then pentoses can be subjected to dehydration to produce furfural. In the recovery steps, the desired end products are recovered by rectification, solvent extraction, filtration, etc.

In connection with these sub-systems and steps, the following observations will be helpful, reference being to FIG. 6, which shows one embodiment of the invention.

Stage I Hydrolysis in Unit 311

The conditions are not as severe as in the sensitization unit 318 and in the second stage hydrolyzer unit 326. For example, a temperature of 140° to 220° C., preferably about 160° to 180° C., is employed. An initial pH of 1.4 to 3.0 (preferably 1.6 to 3.0) and autogenous pressure, such as 75 psi gauge at 160° C. are employed. Residence time is sufficient to accomplish the intended purpose of depolymerization of hemicelluloses to sugars yet to minimize degradation of these sugars. A residence time preferably not exceeding 40 minutes is sufficient and would be decreased to a shorter time as temperature is increased and pH is decreased in the ranges given. Glucose solution, which includes oligomers, produced in Stage II hydrolysis is recycled to the first stage hydrolysis unit to maximize the concentration of monosaccharides leaving separator 314 by line 315. Countercurrent flow is preferred as described above with reference to FIG. 8. Representative concentrations of recycle (line 312) and effluent (line 315) streams are optimized in the range of 2 to 12% monosaccharides in line 315 and 1 to 10% monosaccharides in line 312 to maximize yield of hexose sugars. This provides a relatively high concentration of -monosaccharide in the stream going to fermentation unit 351. Concentrations of monosaccharides in the hydrolysate may be increased, as desired, by evaporation of water before or after neutralization.

Sensitization Step in Unit 318

The conditions of initial pH (1.2 to 3.0, preferably about 1.3 to 2.0), temperature (preferably about 160° to 200° C.) and total pressure (autogenous pressure plus pressure of air) are more severe than in the hydrolysis unit 311. Limited and controlled oxidation is carried out. Suitable rates of introduction are 0.2 to 4.0 grams of oxygen per minute per kilogram of O.D. raw material and depend upon the variables and amount of oxygen to be absorbed. The added acid may be a mineral acid such as nitric, sulfuric or hydrochloric acid; an acid salt such as ferric nitrate or ferric chloride or a mixture of acid and acid salt or an organic acid such as acetic acid, formic acid, oxalic acid generated in the process. The acid is added to adjust pH. By using an organic acid generated in the process, recovery problems are simplified since the added organic acid is separated along with end products of the system. If nitric acid is employed, it will provide the nitrogen required as a nutrient medium for the digestion (aerobic) step or steps. It is believed that in this sensitization step a mild attack occurs on the cellulose structure which renders it more amenable to hydrolyric cleavage in Stage II hydrolysis. In any event, it has been observed that the second stage hydrolysis in unit 326 proceeds at a considerably faster rate, that it can be accomplished at a lower acidity (higher pH) and that a higher yield of reducing sugars results than would result in the absence of the sensitization step. In the hydrolysis of cellulose, acidity and an elevated temperature provide the desired hydrolysis and also produce the competing degradation of monosaccharides. By enabling the second stage hydrolysis to be carried out under milder conditions (higher pH and lower temperature) the sensitizing step promotes the production of sugar and minimizes the degradation of sugars.

Step II Hydrolysis

This is carried out at a relatively high acidity (initial pH about 1.2 to 2.5, preferably about 1.25 to 1.75) and at a higher temperature (about 160° to 240° C., preferably about 180° to 220° C.) and at corresponding autogenous pressure. These conditions are sufficiently severe to accomplish the desired hydrolysis of cellulose to glucose. As pointed out, it is the object to maximize separation of hydrolysate from the ligneous residue by removal of as much hydrolysate as possible and then use countercurrent washing with the slurry wash being recycled to hydrolysis unit 311 and the washed residue being slurried in a water stream which goes to wet oxidation unit 332.

Wet Oxidation

This is an exothermic process which may be used to generate steam for use as a source of heat in the process (heat exchangers are shown in FIG. 7). When compressed air is used to supply oxygen, the hot gas leaving unit 332 (or 450 in FIG. 7) may be expanded through a gas turbine to produce power. The conditions of temperature, pressure and oxygen partial pressure are such as to result in substantially complete breakdown of lignin into simple products including commercially valuable products such as organic acids, methanol, etc. but such as to minimize conversion to carbon dioxide, carbon monoxide and water, or the products of breakdown of lignin may be converted to methane. Generally speaking, the procedures described in Brink, U.S. Pat. No. 3,582,369 may be used.

Among the advantages of this system the following may be mentioned. The concentrations and yield of mono-saccharides leaving the hydrolysis-oxidation system through line 315 are maximized and the time required for overall hydrolysis is reduced. Little or no solids leave the system to present disposal problems. The production of ethanol, methane and other useful organic compounds is accomplished. The wet oxidation step is exothermic and the system as a whole can be made largely independent of an external energy source. Essentially the system can be designed to produce sufficient thermal energy to operate without the necessity of providing surplus energy from outside.

The manner in which the wet oxidation step is carried out can be adjusted to maximize the production of heat or to maximize the production of useful organic materials such as methane, methanol, organic acids and furfural. By using more oxygen, a greater amount of heat is generated and a lesser amount of organic products of value is produced. Conversely, by employing milder conditions, e.g., less oxygen, less heat and more useful organic products result. The recycle of solids to the wet oxidation unit also influences heat production; the more solids recycled, the greater the production of organic products. By maximizing oxidation, a temperature of 220° C. or higher and greater heat production result. By conducting wet oxidation to achieve temperatures of 180° to 220° C., less heat and more useful organic compounds result.

The following specific example, although based on laboratory work and lacking, therefore, the advantageous continuity of a commercial process will serve further to illustrate the hydrolysis-sensitization sub-system of the process.

EXAMPLE

A. Stage I Hydrolysis (Pre-Hydrolysis)

White fir wood comminuted to a −2+4 mesh was used. 4.0 Kilograms (O.D. basis) were used containing 0.5 kilogram water. The wood was slurried in 35.5 kilograms of water and brought to pH 3.0 with nitric acid. This slurry was stirred in a closed reaction vessel and brought to 160° C. in 10 minutes and held at that temperature for 30 minutes. This produced a solution containing 1.16% reducing sugars, pH=2.54 with, of course, undissolved solids. The slurry was cooled to room temperature and was separated by filtration and water washing to give a lignocellulosic residue of 2.85 kg (O.D. basis) or 6.4 kg (wet basis). (In commercial practice a separation would be made of hydrolysate {monosaccharide derived from hemicelluloses}, recycle hydrolysate would be employed, and a combined hydrolysate would be routed to fermentation.)

B. Sensitization 4.0 Kilograms (O.D. basis) of washed, pre-hydrolyzed residue such as produced in A and 3.2 kg of wash water are slurried with water to give 24.4 kg which is brought to pH 2.45 by 72% nitric acid and is heated to 170° C. in a closed vessel in about 10 minutes and held at such temperature with agitation for 60 minutes with sparging with air at the rate of 1.01 gram per minute of oxygen per kg of O.D. wood. The total pressure was maintained at 17.58 kg/sq. cm, the autogenous steam pressure being calculated as 7.04 kg/sq. cm.

C. Stage II Hydrolysis

Stirring of the slurry resulting from B was continued, hydrolysis was initiated by terminating the introduction of air and increasing the temperature to 195° C. in three minutes and releasing off gas to stabilize the pressure at about 24 kg/sq. cm. The temperature was maintained at 195° to 205° C. for 35 minutes at which time a maximum sugar content was obtained in the aqueous phase. The increased rate of hydrolysis in this stage resulting from sensitization step B was calculated to be about four times the rate in the absence of step B.

It will therefore be apparent that a novel and advantageous method and system have been provided for the conversion of lignocellulosic material to useful products with a minimum of degradation to waste products, whether gaseous, liquid or solid and with a minimum input or no input of thermal energy from an external source. Also, the provision of a disintegrating step between the first stage hydrolysis and the second stage hydrolysis greatly diminishes the energy required as compared to that required where mechanical disintegration of biomass solids is carried out before first stage hydrolysis.

GENERAL DISCUSSION OF THE ROLE OF NITRIC ACID IN THE SELECTIVE HYDROLYSIS OF THE HEMICELLULOSIC AND CELLULOSIC COMPONENTS OF LIGNOCELLULOSE

Nitric acid has been used as a pulping medium. For example, it has been used at a concentration of 50 to 70% at room temperatures to attack lignin which is then extracted by diluate sodium hydroxide solution at or below 100° C. This leaves the cellulose substantially unaffected but it somewhat degrades the hemicellulose sugar. It has also been used at 3 to 15% and at decreasing temperature from about 100° to 80° C., respectively, to solubilize lignin. Again, the solubilized lignin is dissolved by extraction with dilute sodium hydroxide solutions leaving cellulose intact with a portion of hemicelluloses.

It is an object of the present invention to provide a process by which hemicellulose can be selectively hydrolyzed to monosaccharides without substantial degradation of the monosaccharides and without significant degradation of the cellulose in the lignocellulosic residue and whereby the lignocellulosic residue can then be treated to hydrolyze the cellulose to glucose without substantial degradation of the glucose product, leaving mainly the lignin content as solid residue with a minor amount of cellulose.

We have found that this can be accomplished by the use of nitric acid at a pH range and at a temperature and for a retention time such that the hemicellulose is selectively depolymerized to monosaccharides with minor degradation of the monosaccharides and without substantial degradation of cellulose; separating the lignocellulosic residue, preferably subjecting it to attrition as described above, and subjecting it to more severe conditions of treatment with nitric acid (i.e., a lower pH, a higher temperature and a retention time adjusted to the particular pH and temperature used). Conditions in the second stage hydrolysis are selected to maximize yield and minimize degradation of glucose.

By way of example, first stage hydrolysis may be carried out at a temperature of 160° to 190° C., an initial pH of 1.4 to 2.0 and a retention time of 10 to 60 minutes. A maximum yield of monosaccharides derived from hemicellulose is obtained, the cellulosic content of the biomass material is not degraded and the lignin is not changed substantially.

The resulting slurry is treated to remove the monosaccharide solution; the remaining solids are subjected to attrition and they are then treated at an initial slurry pH of about 1.25 to 1.7, at a temperature of about 200° to 230° C. with retention times of 1.5 to 10 minutes.

Typically at 220° C. and a pH of 1.25 to 1.5 a retention time of 1.5 to 3.0 minutes provides a maximum yield of glucose without substantial degradation. In the same pH range and 215° C., a retention time of 2 to 4 minutes is suitable. In the same pH range and 210° C., a retention time of 3 to 6 minutes is required. At temperatures above about 225° to 230° C. or at pH values less than about 1.2 to 1.25 oxidation and degradation of the glucose and lignocellulose becomes significant.

It will be understood that optimum pH, temperature and retention time will vary slightly from one type of biomass material to another but the limited ranges of the variables given are typically those needed to give optimum and economically viable results.

What is claimed is:

1. Finely ground solids resulting from treatment of lignocellulosic material by mild hydrolysis followed by mechanical disintegration, said hydrolysis being such as to depolymerize principally the hemicellulose content of the lignocellulosic material without substantial depolymerization of the more difficultly depolymerizable cellulosic content of the lignocellulosic material, said finely ground solids having a substantially reduced content or substantially zero content of hemicellulose.

* * * * *